United States Patent [19]
Kawagoe

[11] Patent Number: 6,017,044
[45] Date of Patent: Jan. 25, 2000

[54] AUTOMOBILE SUSPENSION SYSTEM

[75] Inventor: Kenji Kawagoe, Kanagawa, Japan

[73] Assignee: Nissan Motor Co., Ltd., Yokohama, Japan

[21] Appl. No.: 08/887,236

[22] Filed: Jul. 2, 1997

[30] Foreign Application Priority Data

Jul. 5, 1996 [JP] Japan .................................. 8-176193

[51] Int. Cl.[7] .................................................. B60G 13/00
[52] U.S. Cl. ......................... 280/124.106; 280/124.145; 188/322.12; 267/220
[58] Field of Search .................... 280/124.141, 124.159, 280/124.142, 124.145, 124.146, 124.16, 124.103, 124.104, 124.106, 5.506, 5.513, 5.515, 5.519; 188/322.12, 321.11; 267/35, 220, 226

[56] References Cited

U.S. PATENT DOCUMENTS

| | | | |
|---|---|---|---|
| 3,677,561 | 7/1972 | McNally | 280/124.141 |
| 4,484,767 | 11/1984 | Klem | 280/772 |
| 4,550,926 | 11/1985 | MacIsaac | 280/112.2 |
| 4,711,463 | 12/1987 | Knable et al. | 267/220 |
| 5,192,057 | 3/1993 | Wydra et al. | 267/220 |
| 5,310,200 | 5/1994 | MacIsaac | 280/112.2 |
| 5,372,377 | 12/1994 | Lee | 280/93.512 |
| 5,678,808 | 10/1997 | Claude et al. | 188/321.11 |

FOREIGN PATENT DOCUMENTS 4-90911  3/1992  Japan .

Primary Examiner—Paul N. Dickson
Assistant Examiner—Lynda Jasmin
Attorney, Agent, or Firm—Foley & Lardner

[57] ABSTRACT

An automobile suspension system comprises a front suspension having at least a spring placed between sprung and unsprung masses to support the sprung mass thereon and a shock absorber placed between the sprung and unsprung masses to regulate spring rebound and bound, and a rear suspension having at least a spring placed between the sprung and unsprung masses to support the sprung mass thereon and a shock absorber placed between the sprung and unsprung masses to regulate spring rebound and bound. Vertical downward jacking-force characteristics of the front suspension is set to be stronger relatively with respect to vertical downward jacking-force characteristics of the rear suspension during cornering.

9 Claims, 11 Drawing Sheets

FRONT

FRONT

FRONT

OUTSIDE-SUSPENSION COMPRESSION STROKE — INSIDE-SUSPENSION EXTENSION STROKE
— SAME —

FRONT OUTSIDE-SUSPENSION COMPRESSION STROKE (GREATER) — FRONT INSIDE-SUSPENSION EXTENSION STROKE (SMALLER)

REAR OUTSIDE-SUSPENSION COMPRESSION STROKE (SMALLER) — REAR INSIDE-SUSPENSION EXTENSION STROKE (GREATER)

AUTOMOBILE SUSPENSION SYSTEM

BACKGROUND OF THE INVENTION

1. Field of the Invention

The present invention relates to an automobile independent suspension system, and specifically to technologies of automobile independent suspension systems which improve the driver feel, particularly a sensation created by the body roll during cornering by properly setting a ratio of a spring constant or a spring stiffness at each end of the vehicle on extension during rebound with respect to a spring constant at each end on compression during bound (or during jounce).

2. Description of the Prior Art

This type of suspension system for automobiles has been disclosed in Japanese Patent Provisional Publication No. 4-90911. The Japanese Patent Provisional Publication No. 4-90911 teaches the use of a higher bushing spring-constant (the stiffness of bushings incorporated in suspension arms) on extension during rebound in comparison with a bushing stiffness on compression during jounce. Thus, when the suspension moves into jounce and rebound and the movable end of the suspension arm with bushings swings, the bushes become softer on compression during bound and becomes harder on extension during rebound. Thus, during cornering, a rebound stroke of the inside suspension (or the inside suspension displacement in rebound) is less than a bound stroke of the outside suspension (or the outside suspension displacement in jounce). As a result of this, the body roll angle can be reduced effectively on turns. This improves the driver feel characteristics particularly roll feel characteristics. The use of bush having different bush stiffnesses on rebound and bound strokes, provides a simple and better suspension system, while allowing for slight assembly misalignment and at the same time achieving the anti-roll effect. The prior art suspension system is directed merely to the proper setting of the spring constant (the bush stiffness) of the bushing employed in the suspension arm on the jounce stroke and on the rebound stroke differently from each other. However, to more greatly enhance the driver feel (the roll feel) during cornering, it is desired to properly control roll-center-height characteristics as well as jack-up and jack-down characteristics (or jacking-force characteristic) whose jacking phenomenon is greatly affected by a bump-stop rubber serving as a nonlinear spring element.

SUMMARY OF THE INVENTION

Accordingly, it is an object of the invention to provide an automobile independent suspension system which avoids the aforementioned disadvantages of the prior art.

It is another object of the invention to provide an automobile independent suspension system, which can properly control jack-up and jack-down characteristics at each of front and rear suspensions to greatly improve the driver feel (roll feel) during cornering.

In order to accomplish the aforementioned and other objects of the present invention, an automobile suspension system comprises a front suspension having at least a spring placed between sprung and unsprung masses to support the sprung mass thereon and a shock absorber placed between the sprung and unsprung masses to regulate spring rebound and bound, and a rear suspension having at least a spring placed between the sprung and unsprung masses to support the sprung mass thereon and a shock absorber placed between the sprung and unsprung masses to regulate spring rebound and bound, wherein jack-down characteristics of the front suspension is set to be stronger relatively with respect to jack-down characteristics of the rear suspension during cornering.

DESCRIPTION OF THE PREFERRED EMBODIMENTS

Figure 1:
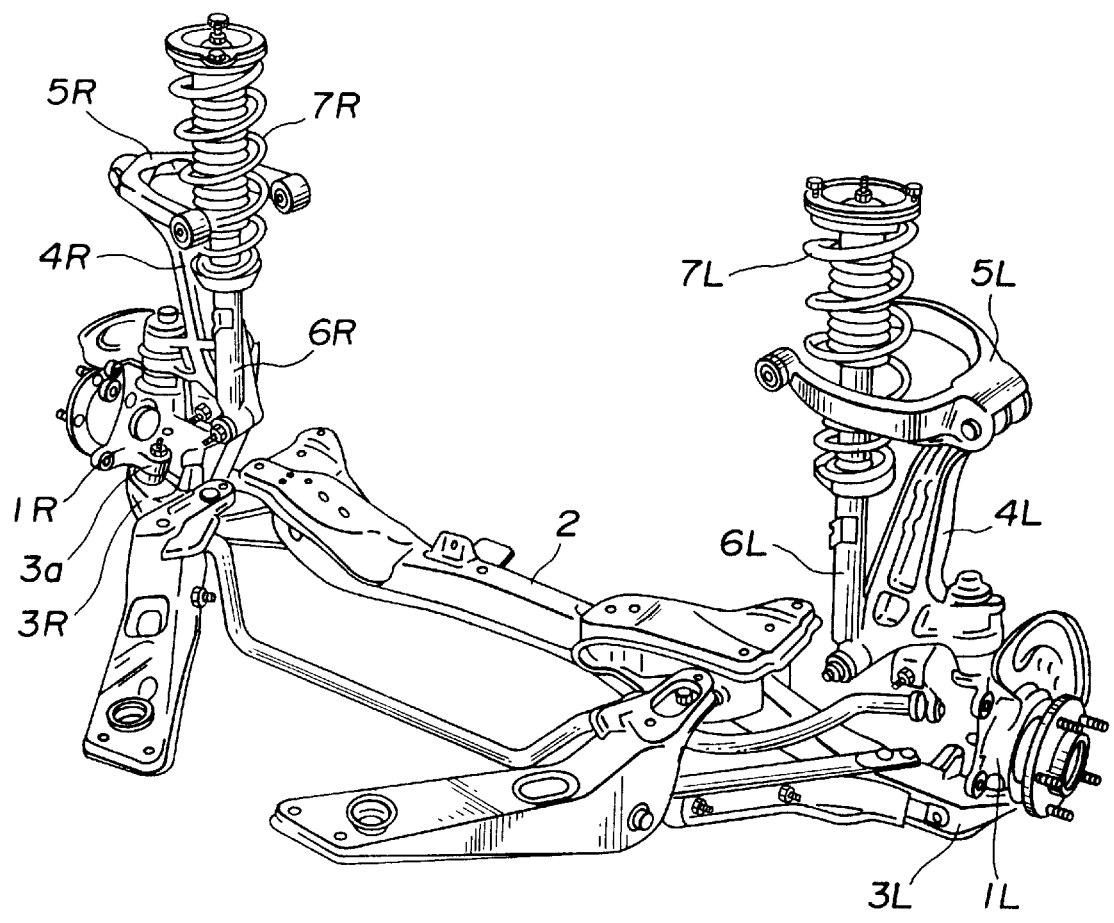
FIG. 1 is a perspective view illustrating independent front suspension systems made according to the invention.
Figure 2:
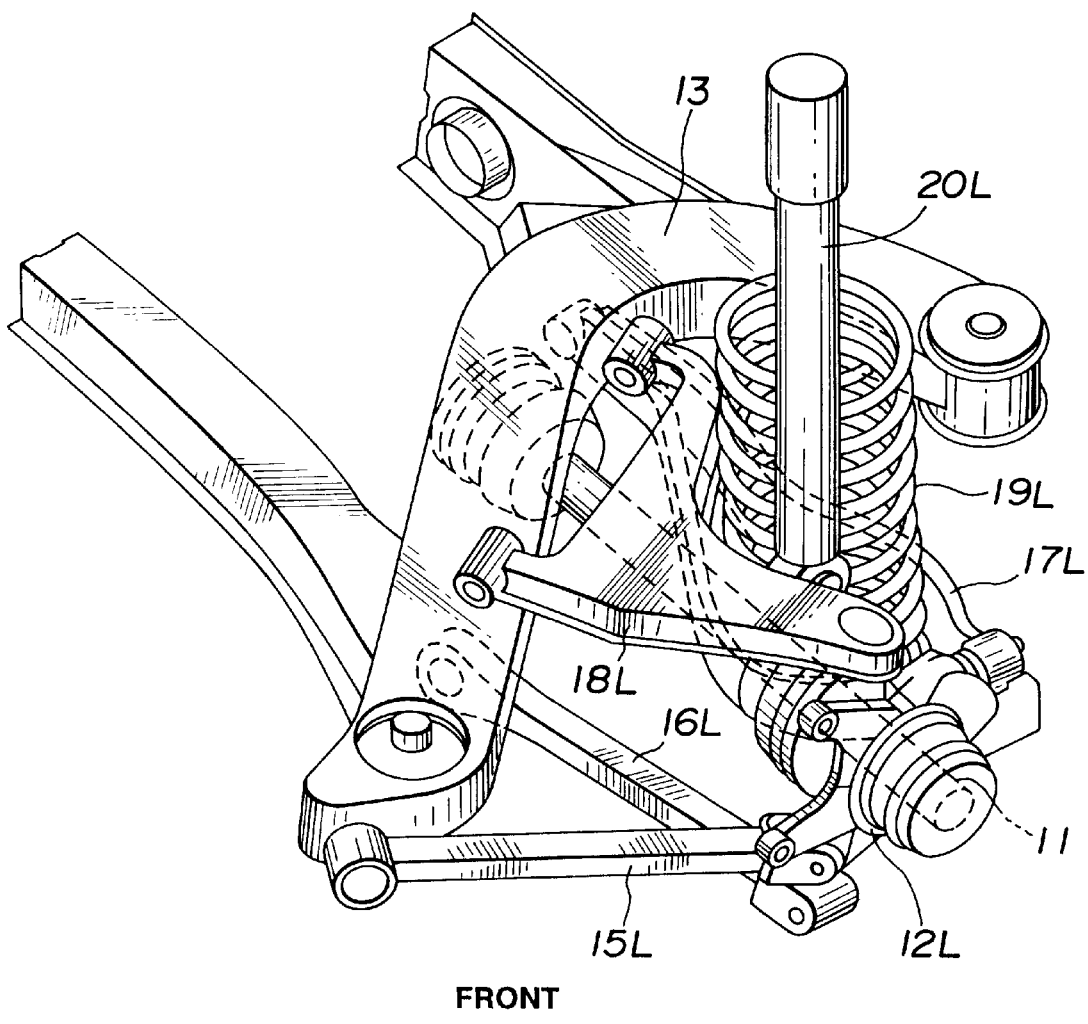
FIG. 2 is a perspective view illustrating one of independent rear suspension systems made according to the invention.
Figure 3:
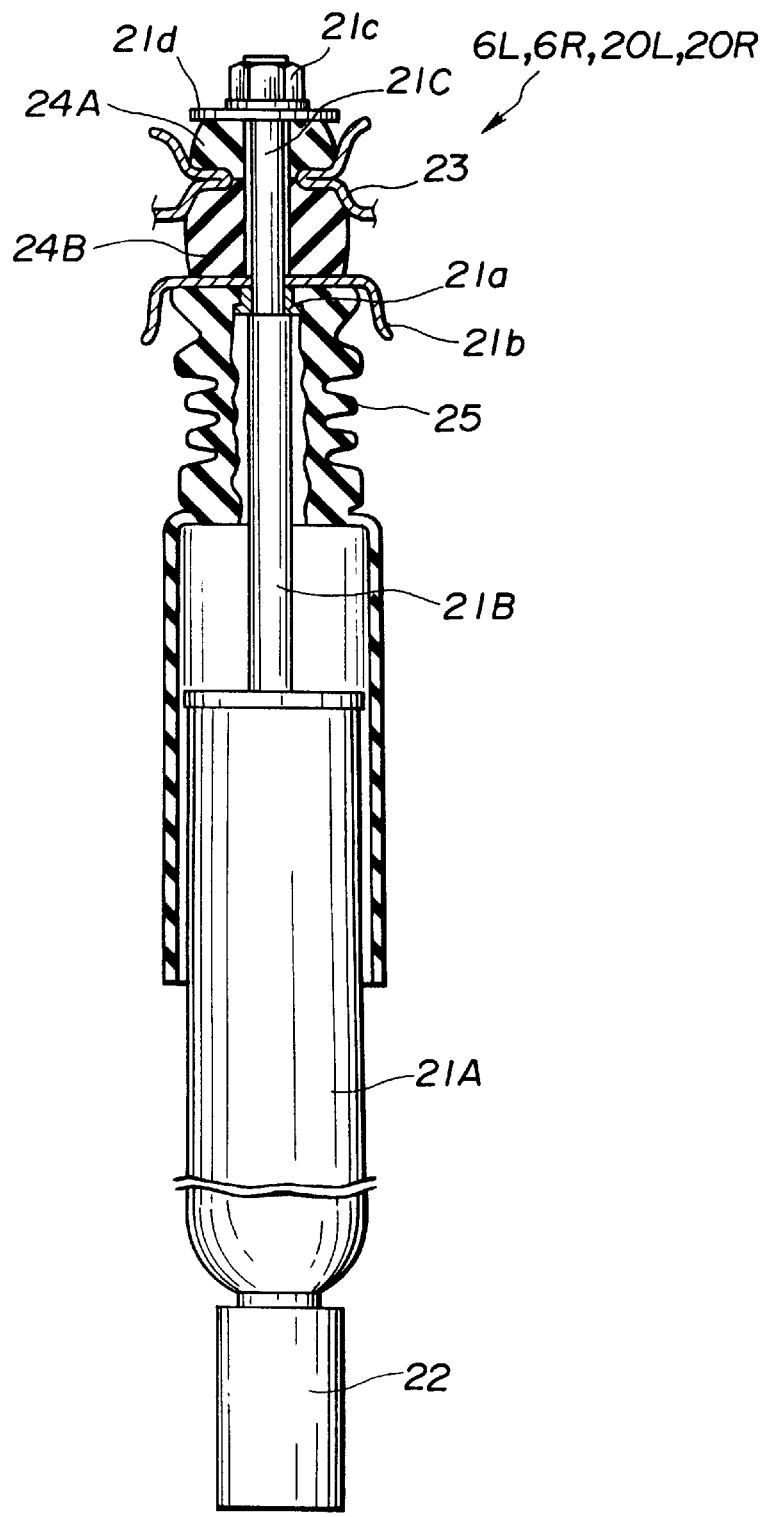
FIG. 3 is a longitudinal cross-sectional view illustrating a shock absorber incorporated in the independent suspension system of the invention.
Figure 4:
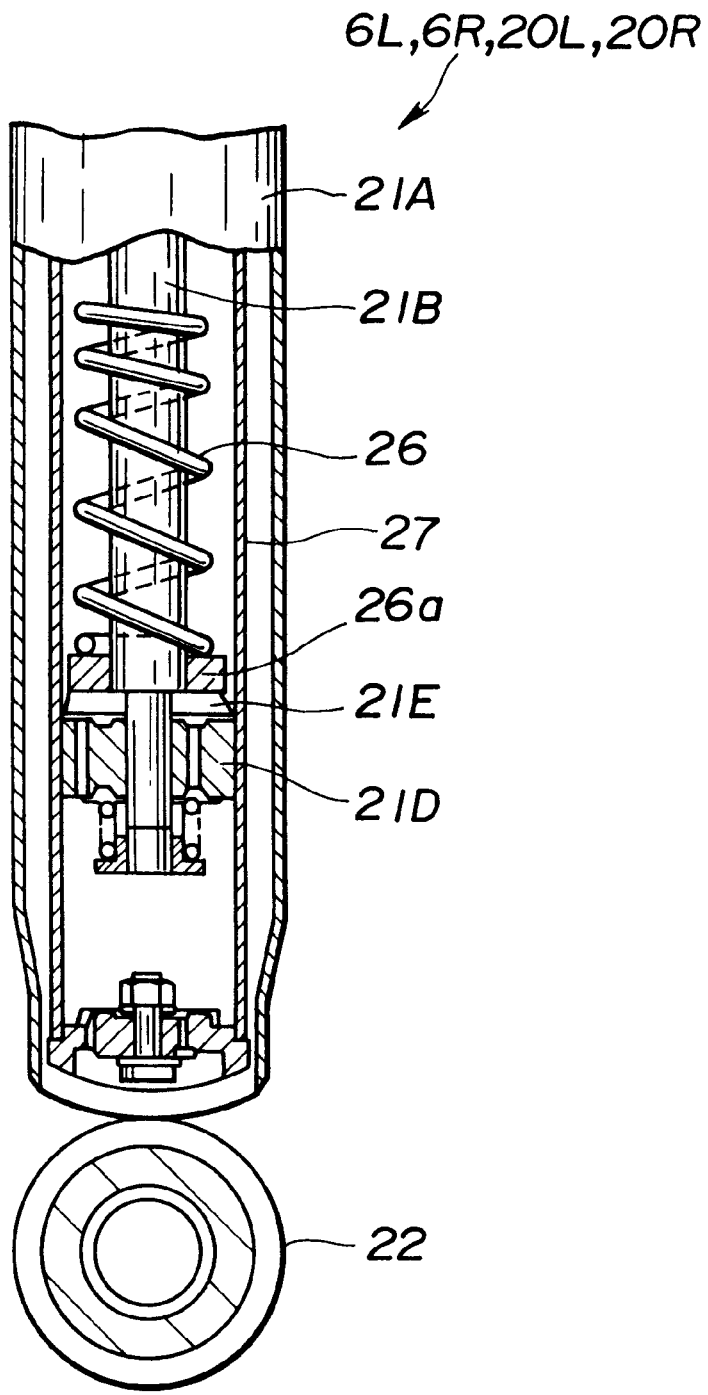
FIG. 4 is a partial cross-sectional view illustrating details of the lower half of the shock absorber shown in FIG. 3.
Figure 5:
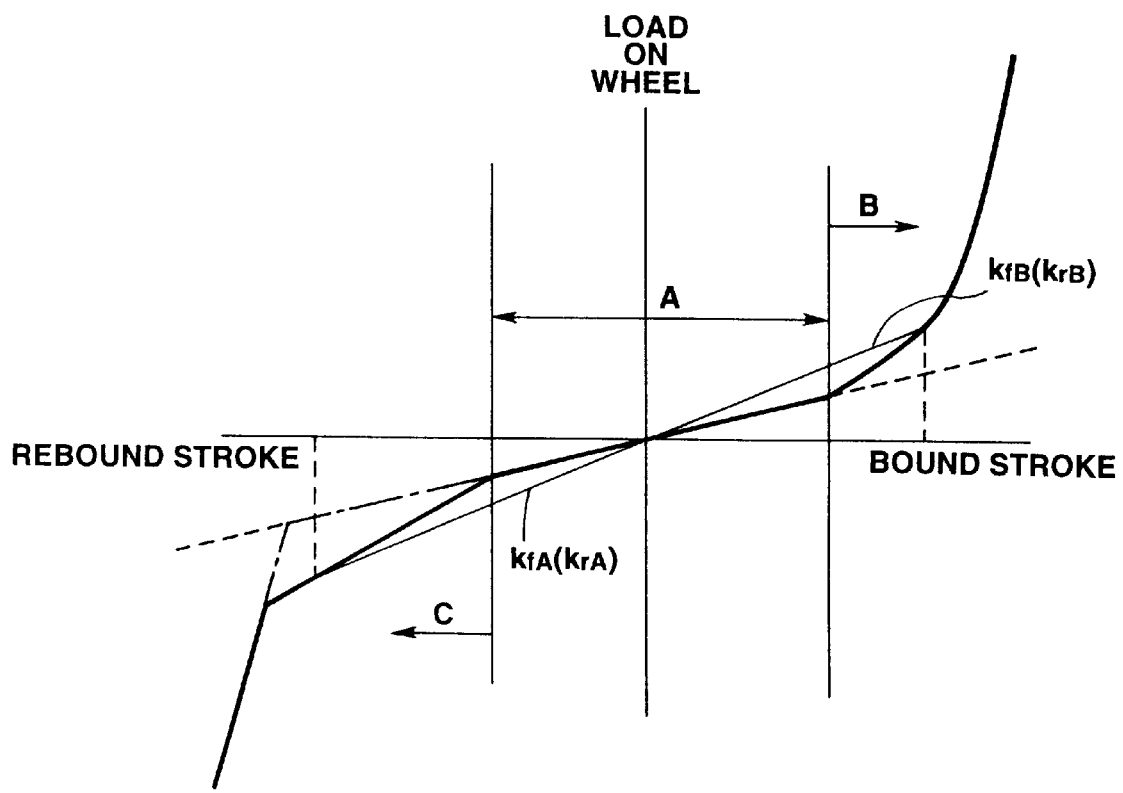
FIG. 5 is a graph illustrating wheel-load versus suspension stroke characteristics.
Figure 6A:
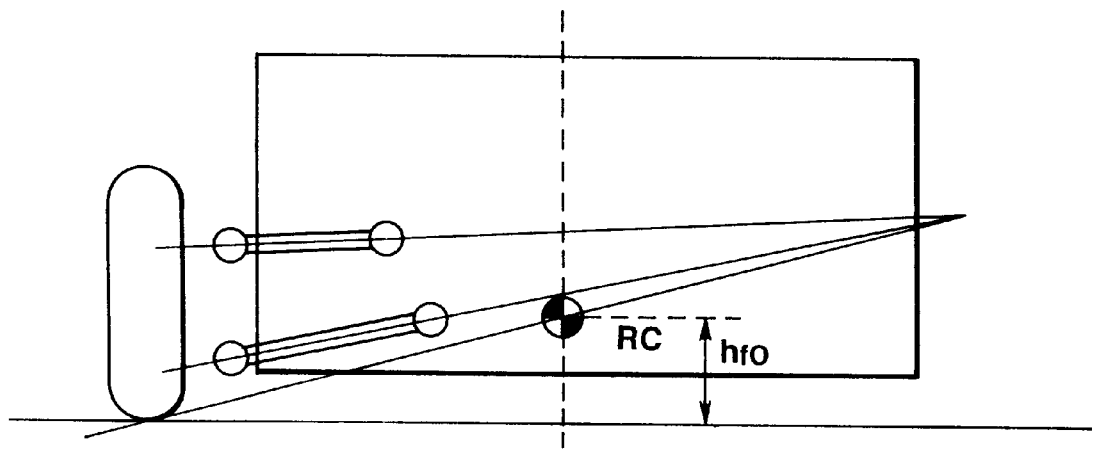
FIGS. 6A and 6B are explanatory views showing height changes in the roll center RC, when there is no front suspension roll and during rebound at the front suspension with a rebound stroke S.
Figure 6B:
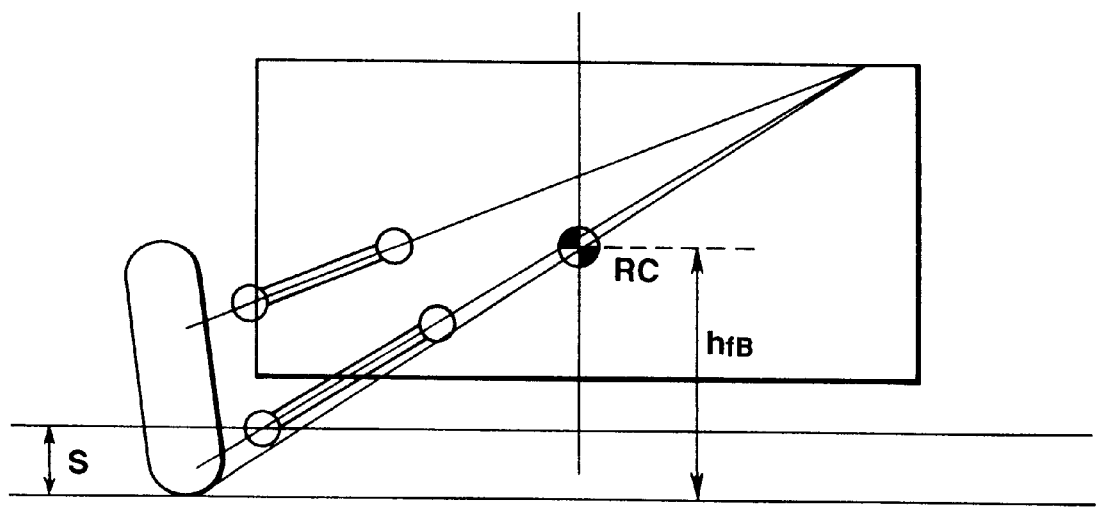

Referring now to the drawings, FIG. 1 shows front-left and front-right independent suspension systems made according to the invention, while FIG. 2 shows a rear-left independent suspension system made according to the invention. As may be appreciated from FIGS. 1 and 2, each of the front and rear independent suspension systems of the invention is exemplified in case of a so-called multi-link suspension system for an automobile. The rear-left independent suspension system is symmetrical with the rear-right independent suspension system with respect to the longitudinal center line of the automobile and the constructions of the rear suspension systems are identical to each other. Thus, note that for the sake of illustrative simplicity, only the rear-right suspension system is shown. As seen in FIG. 1, the front independent suspension system includes a suspension member 2, and left and right steering knuckles 1L and 1R, respectively rotatably supporting front-left and front-right road wheels (not shown). In the front independent suspension system, the knuckles 1L and 1R are pivoted through a plurality of links to the suspension member 2 and permit the respective front road wheels to be turned to steer to car. The lower ends of the knuckles 1L and 1R are coupled with the suspension member 2 through the respective laterally-extending lower links 3L and 3R. In a conventional manner, the left-knuckle lower end is supported on the left lower link 3L by way of a ball joint 3a, whereas the right-knuckle lower end is supported on the right lower link 3R by way of a ball joint 3a. The upper ends of the knuckles 1L and 1R are rotatably supported on the lower ends of the respective third links 4L and 4R by means of ball joints 3a. The upper ends of the left and right third links 4L and 4R are pivotally linked to the outer ends of the respective upper arms 5L and 5R via a shaft (not numbered) extending substantially in the longitudinal direction of the vehicle. The forked inside ends of each of the upper arms 5L and 5R are pivoted to the car body or the car frame through essentially cylindrical-hollow bushings and pivot shafts (not numbered) extending substantially in the longitudinal direction of the vehicle and fitted into the associated bushings. A pair of front-left and front-right shock absorbers 6L and 6R are placed between the inner sides of the lower ends of the third links 4L and 4R and the car body to produce viscous damping caused by fluid friction between sprung weight and unsprung weight and to quickly dampen out spring oscillations and thus to effectively regulate spring rebound and compression. Coil springs 7L and 7R are installed between the car body and the associated cup-like spring insulators or lower spring seats attached to the outer tubes of the shock absorbers to support the car weight. On the other hand, as shown in FIG. 2, the rear-left suspension system includes an axle housing 12L which rotatably supports an axle 11 to which a driving torque is transmitted from a rear differential (not shown) via a universal-velocity type universal joint (not numbered), often called a constant-speed type universal joint. The rear-left axle housing 12L is supported on a suspension member 13 through a plurality of links 15L, 16L, 17L and 18L which will be fully described later. The radius rod 15L is pivoted at the rear end to the front lower end of the axle housing 12L, and at the front end to the suspension member 13. The first lateral link 16L is pivoted at the outside end to another portion of the front lower end of the axle housing 12L and at the inside end to the suspension member 13. The second lateral link 17L is pivoted at the outside end to the rear lower end of the axle housing 12L and at the inside end to the suspension member 13. The upper arm 18L is pivotally and turnably connected at the outside end to the front upper end of the axle housing 12L via a ball joint. The upper arm 18L is formed with a substantially semi-circular recessed section to permit installation of the coil spring 19L within a limited space. The upper arm 18L is formed with a pair of forked inside ends which are pivotably connected to the suspension member 13. The second lateral link 17L is formed with a comparatively wide spring seat section on which one end of the coil spring rests. The rear-left shock absorber 20L is connected at the lower end to the upper inside end of the axle housing 12L, and resiliently or elastically connected at the upper end to the car body, so as to produce a proper damping force between sprung and unsprung weight at the rear left end of the car. The rear right shock absorber denoted by 20R is also connected at the lower end to the upper inside end of the rear-right axle housing and resiliently or elastically connected at the upper end to the car body. Throughout the specification, the reference character L means the left-hand side of the car, while the reference character R means the right-hand side of the car. For example, the element denoted by 20R corresponds to the rear right shock absorber and the element denoted by 6R corresponds to the front right shock absorber. As described above, in the shown embodiment, the front and rear suspension systems are constructed by the independent type of front and rear suspension systems. The independent front-left and front-right suspension systems 6L and 6R function to produce damping forces between sprung and unsprung masses at the front-left and front-right ends of the car independently of each other. The independent rear-left and rear-right suspension systems 20L and 20R function to produce damping forces between sprung and unsprung masses at the rear-left and rear-right ends of the car independently of each other. As shown in FIGS. 3 and 4, each of the front and rear shock absorbers 6L, 6R, 20L and 20R has almost the same construction in cross section. As seen in FIG. 3, the shock absorber (6L; 6R; 20L; 20R) is formed at its lower end with a ring-and-bushing assembly 22 including elastomeric or elastic rubber suspension bushing to provide a reasonably flexible mounting on the other suspension parts, namely the third links 4L and 4R, and the axle housings 12L and 12R. The piston rod 21B of the shock absorber is coaxially upwardly projected from a piston-rod guide and seal assembly (not shown) fitted to the upper ends of the reservoir tube 21A and the cylinder tube 27. The piston rod 21B is formed at its upper section with a screw-threaded portion 21C. A bracket or a retainer 21b is fitted onto the threaded portion 21C in such a manner as to rest on the upper face of an essentially annular sleeve 21a, being coaxially fitted to the stepped portion between the comparatively large-diameter piston-rod portion and the comparatively small-diameter threaded portion 21C. Reference sign 21c denotes a retaining nut. A pair of elastic grommet members 24A and 24B are provided between the upper face of the retainer 21b and the lower face of a washer 21d put beneath the retaining nut 21c, while sandwiching the upper support of the car body 23. That is, the retaining nut 21c is tightened under a condition in which the upper end of each of the shock absorbers 6L, 6R, 20L and 20R is encased in the pair of elastomeric or elastic grommet members 24A and 24B sandwiching the upper support of the car body. This ensures elastic or resilient connection of the upper end of the shock absorber to the car body 23. The retainer 21b has an inverted dish-like shape in cross section. A bump rubber 25, composed of a rubber-like elastic member and serving as a second auxiliary spring, is attached at its upper end to the lower face of the retainer 21b through the sleeve 21a, so that the bump rubber 25, the piston rod 21B and the retainer 21b are arranged coaxially with each other. As seen in FIG. 3, the bump rubber 25 is formed as a relatively thick-walled cylindrical bellows-like elastic member which surrounds the piston rod 21B. The bump rubber 25 does not yet function to regulate the shock-absorber compression stroke if the shock absorber extends and contracts within usual extension and compression strokes. The bump rubber 25 functions to regulate the shock-absorber compression stroke as a limit of the shock-absorber compression is reached. For example, if a large bump in the road is encountered, the upper end of the reservoir tube 21A moves towards the retainer 21b with a great compression of the shock absorber, and then the upper end of the reservoir tube 21A abuts the bump rubber 25, and further moves upwards while elastically deforming the bump rubber 25. As a result, the spring force of the bump rubber 25 acts between the sprung and unsprung masses to suppress the road wheel to bound excessively, thus preventing collision between the wheel and the car body. In the shown embodiment, the bump rubber 25 and the shock absorber are concentric to each other, in consideration of the advantage of installation space and easy and efficient assembling. As seen in FIG. 4, a rebound spring 26 is provided in the cylinder tube 27 in such a manner as to surround the piston rod 21B. The rebound spring 26 serves as a first auxiliary spring which suppresses the wheel to rebound excessively. The piston 21D is connected to the lower end of the piston rod 21B by means of a piston retaining and flow-restriction device such as a piston retaining washer 21E, a piston-rod nut, a flow-restriction disc valve and/or a rebound valve spring. A rubber-like elastic member 26a is provided on the upper face of the piston retaining washer 21E. The rubber-like elastic member 26a serves as a spring seat for the rebound spring 26. The rebound spring 26 does not yet function to regulate the shock-absorber extension stroke if the shock absorber extends and contracts within usual extension and compression strokes. The rebound spring 26 functions to regulate the shock-absorber extension stroke as a limit of the shock-absorber extension is reached. For example, when the shock absorber extends greatly during rebound and thus the piston 21D greatly moves upwards (viewing FIG. 4) with respect to the cylinder tube 27, the upper end of the rebound spring 26 is brought into abutment with a stopper (not shown) formed at the bottom of the piston-rod guide and seal assembly (not shown). Thereafter, the piston 21D further moves upwards, elastically deforming the rebound spring 26. As a consequence, the spring force of the rebound spring 26 acts between the sprung and unsprung masses to suppress the wheel to rebound excessively. In the front and rear independent suspension systems of the embodiment, in addition to the coil springs 7L, 7R, 19L and 19R, the bump rubber 25 and the rebound spring 26 are used as additional spring elements, so that the bump rubber 25 acts to suppress excessive wheel and spring movements on compression during bound when the bound stroke exceeds a predetermined limit of the suspension compression stroke and so that the rebound spring 26 acts to suppress excessive wheel and spring movements on extension during rebound when the rebound stroke exceeds a predetermined limit of the suspension extension stroke. Thus, the relationship between the load on the road wheel and the bound/rebound strokes, in other words, the spring constant (the spring stiffness) at each end of the vehicle, which could greatly affect the roll stiffness of each end, can be summarized by the graph shown in FIG. 5. As seen in FIG. 5, the bump rubber 25 and the rebound spring 26 both do not yet act within a predetermined region A in which bound and rebound strokes are both relatively smaller. Within the region A, only the spring force of the coil spring (7L; 7R; 19L; 19R), serving as a linear spring, acts between the sprung and unsprung masses, and the spring constant (the spring stiffness) at each end of the vehicle is comparatively smaller, as appreciated from the solid line segment of a comparatively smaller gradient. In the event that the suspension stroke is shifted from suspension strokes within the region A to a greater bound stroke within a region B, which greater bound stroke will be experienced by the outside wheel during cornering, the bump rubber 25, serving as a non-linear spring, begins to act. When the bump rubber 25 is acting at the outside suspension during cornering, the spring constant (the spring stiffness) of the outside suspension tends to remarkably increase in accordance with an increase in the suspension bound stroke. On the contrary, in the event that the suspension stroke is shifted from suspension strokes within the region A to a greater rebound stroke within a region C, which greater rebound stroke will be experienced by the inside wheel during cornering, the rebound spring 26, serving as a linear spring, begins to act. When the rebound spring 26 is acting at the inside suspension during cornering, the spring constant (the spring stiffness) of the inside suspension tends to increase in accordance with an increase in the suspension rebound stroke. When the rebound spring 26 is compressed to the maximum limit, the rubber-like elastic member 26a begins to act. With the rebound spring 26 compressed to the maximum, when the elastic member 26a, serving as the spring seat of the rebound spring 26, is resiliently acting, the spring constant (the spring stiffness) of the inside suspension tends to further increase in accordance with an increase in the suspension rebound stroke. In the spring-constant characteristics shown in FIG. 5, the solid line indicates the spring-constant characteristics of the suspension system of the present embodiment having a coil spring (7L; 7R; 19L; 19R) and a shock absorber with both the bump rubber 25 and the rebound spring 26, the one-dotted line indicates a suspension system having a coil spring and a shock absorber employing the bump rubber 25 but not employing the rebound spring 26, and the broken line indicates a suspension system having a coil spring and a shock absorber not employing any one of the bump rubber 25 and the rebound spring 26. In case of the independent suspension system made according to the invention, assuming that $k_{fA}$ denotes a spring constant (a spring stiffness) at each of front-left and front-right ends of the vehicle (or at each of the front-left and front-right suspensions) on extension during rebound, $k_{fB}$ denotes a spring constant (a spring stiffness) at each of front-left and front-right ends of the vehicle on compression during bound, $k_{rA}$ denotes a spring constant at each of rear-left and rear-right ends of the vehicle (or at each of the rear-left and rear-right suspensions) on extension during rebound, $k_{rB}$ denotes a spring constant at each of rear-left and rear-right ends of the vehicle on compression during bound, the ratio $\epsilon_f (=k_{fB}/k_{fA})$ of the spring constant $k_{fB}$ to the spring constant $k_{fA}$ is determined to satisfy the following inequality (1).

$$\varepsilon_f \leq \frac{h - (t/2 + \alpha \cdot h)(-a_f \phi + 2h_{f0}/t + \phi)}{h - (t/2 - \alpha \cdot h)(a_f \phi + 2h_{f0}/t - \phi)} \tag{1}$$

where $\phi$ denotes a roll angle of the vehicle and is equal to $W\alpha h/(K_f + K_r)$, W denotes a car weight, $\alpha$ denotes a centripetal acceleration, $K_f$ denotes a roll stiffness of the front wheel side, $K_r$ denotes a roll stiffness of the rear wheel side, h denotes a height of center of gravity of the vehicle, $h_{f0}$ denotes an initial height of the front-wheel side roll center, t denotes a track or a tread being equivalent to the traverse distance between the left and right side wheels on the front axle, usually measured between specified points such as the centers of the tire contact of the front road wheels, and $a_f$ denotes a rate of change in the roll center of the front wheel side with respect to a front-suspension stroke. Also, the ratio $\epsilon_r (=k_{rB}/k_{rA})$ of the spring constant $k_{rB}$ to the spring constant $k_{rA}$ is determined to satisfy the following inequality (2).

$$\varepsilon_r \geq \frac{h - (t/2 + \alpha \cdot h)(-a_r\phi + 2h_{r0}/t + \phi)}{h - (t/2 - \alpha \cdot h)(a_r\phi + 2h_{r0}/t - \phi)} \quad (2)$$

where φ denotes a roll angle of the vehicle and is equal to Wαh/(K$_f$+K$_r$), W denotes a car weight, α denotes a centripetal acceleration, K$_f$ denotes a roll stiffness of the front wheel side, K$_r$ denotes a roll stiffness of the rear wheel side, h denotes a height of center of gravity of the vehicle, h$_{r0}$ denotes an initial height of the rear-wheel side roll center, t denotes a track or a tread being equivalent to the traverse distance between the left and right side wheels on the rear axle, usually measured between specified points such as the centers of the tire contact of the rear road wheels, and a$_r$ denotes a rate of change in the roll center of the rear wheel side with respect to a rear-suspension stroke. With regard to the rate-of-change a$_f$ of the roll center RC at the front end of the vehicle utilized in the inequality (1), assuming that the roll center height of the front wheel side is shifted from its initial roll center height h$_{f0}$ shown in FIG. 6A to a greater roll center height hfB shown in FIG. 6B with a suspension rebound stroke S during cornering, the rate of change a$_f$ is determined by the following expression (4).

$$a_f = (h_{fB} - h_{f0})/S \quad (4)$$

In the same manner, the rate-of-change a$_r$ of the roll center RC at the rear end of the vehicle is determined by the following expression (5).

$$a_r = (h_{rB} - h_{r0})/S \quad (5)$$

For easy understanding of the operation and effects of the independent suspension system of the embodiment, the meaning and contents of the previously-noted inequalities (1) and (2) will be fully discussed later. That is to say, in order to properly control a roll-center height of the front-wheel side, a roll-center height of the rear-wheel side, and jack-up and jack-down characteristics, and consequently to improve the driver feel such as a sensation created by the body roll during cornering, the ratio of a spring constant (a spring stiffness) at each of front-left and front-right ends of the vehicle on compression during bound to a spring constant (a spring stiffness) at each of front-left and front-right ends of the vehicle on extension during rebound, and the ratio of a spring constant (a spring stiffness) at each of rear-left and rear-right ends of the vehicle on compression during bound to a spring constant (a spring stiffness) at each of rear-left and rear-right ends of the vehicle on extension during rebound are determined according to the following detailed force analysis of the front and rear suspensions.

When the car makes a steady turn with a centripetal acceleration α, the amount ΔW$_r$ of load-transfer of the rear suspension is expressed as follows.

$$\Delta W_r = W(1-\gamma)\alpha h/t (=\alpha W(1-\gamma)\cdot h/t)$$

where W denotes a car weight, γ denotes a car-weight distribution rate of the front road wheels with respect to the rear road wheels, h denotes a height of center of gravity of the car, and t denotes a track or a tread being equivalent the traverse distance between the left and right side wheels on the rear axle. Under a particular condition in which there is no load transfer between left and right ends of the car, the product Wγ of the car weight W and the distribution ratio γ corresponds to the total front-wheel vertical force, whereas the product W(1−γ) of the car weight W and the distribution ratio (1−γ) corresponds to the total rear-wheel vertical force.

When the vehicle is in steady-state cornering, the vertical forces on the outer road wheels (or outer tires) increase at the expense of those of the inner road wheels (or inner tires), and thus there is vertical-force component transferred laterally, commonly called "lateral load transfer". The wheel vertical force W$_{rA}$ (or the wheel vertical load) on one rear inner road wheel, is obtained as the difference between one-half (W/2)·(1−γ) of the total rear-wheel vertical force W(1−γ) and the lateral load transfer ΔW$_r$, as represented by the following expression.

$$W_{rA} = (W/2) \cdot (1-\gamma) - \Delta W_r$$
$$= (W/2) \cdot (1-\gamma) - W\alpha h(1-\gamma)/t$$

The wheel vertical force W$_{rB}$ (or the wheel vertical load) on one rear outer road wheel, is obtained as the sum of one-half (W/2)·(1−γ) of the total rear-wheel vertical force W(1−γ) and the lateral load transfer ΔW$_r$, as represented by the following expression.

$$W_{rB} = (W/2) \cdot (1-\gamma) + \Delta W_r$$
$$= (W/2) \cdot (1-\gamma) + W\alpha h(1-\gamma)/t$$

The total rear wheel cornering force F$_r$ is expressed as F$_r$=Wα(1−γ), since a cornering force of the tire is essentially in proportion to the wheel vertical load. Therefore, the rear inner wheel cornering force F$_{rA}$ and the rear outer wheel cornering force F$_{rB}$ are expressed as follows.

$$F_{rA} = W\alpha(1-\gamma) \cdot W_{rA}/(W_{rA}+W_{rB})$$
$$= W\alpha(1-\gamma) \cdot \{(W/2) \cdot (1-\gamma) - W\alpha h(1-\gamma)/t\}/\{W(1-\gamma)\}$$
$$= \alpha\{(W/2) \cdot (1-\gamma) - W\alpha h(1-\gamma)/t\}$$
$$= \alpha W(1-\gamma) \cdot \{1/2 - \alpha h/t\}$$

$$F_{rB} = W\alpha(1-\gamma) \cdot W_{rB}/(W_{rA}+W_{rB})$$
$$= W\alpha(1-\gamma) \cdot \{(W/2) \cdot (1-\gamma) + W\alpha h(1-\gamma)/t\}/\{W(1-\gamma)\}$$
$$= \alpha\{(W/2) \cdot (1-\gamma) + W\alpha h(1-\gamma)/t\}$$
$$= \alpha W(1-\gamma) \cdot \{1/2 + \alpha h/t\}$$

On the other hand, the roll angle φ of the vehicle body is obtained from the following expression, since the roll angle φ is defined to be proportional to both the centripetal acceleration α and the height h of center of gravity of the car weight and to be inversely proportional to the total roll stiffness (K$_f$+K$_r$) which is defined as the sum of the roll stiffness K$_f$ of the front wheel side of the vehicle and the roll stiffness K$_r$ of the rear wheel side.

$$\phi = W\alpha h/(K_f+K_r)$$

Thus, the inside or outside suspension stroke (or the inside-wheel or outside-wheel stroke) S is expressed as follows.

$$S = (t/2) \cdot \phi$$

Figure 7:
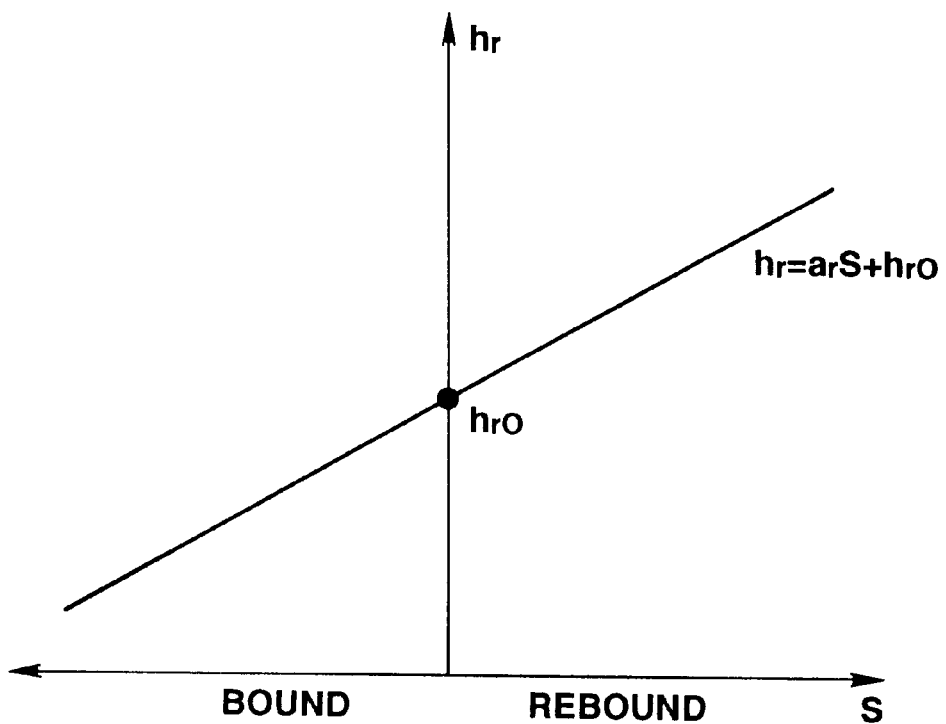
FIG. 7 is a graph illustrating the relationship between a rear suspension stroke S and a roll center height $h_r$ of the rear suspension.

As shown in FIG. 7, assuming that the roll-center height characteristics of the rear suspension systems are linear characteristics according to which the roll-center height h$_r$ of the rear wheel varies linearly across the initial roll-center height h$_{r0}$ in accordance with changes in bound/rebound strokes, the inside wheel roll-center height h$_{rA}$ on the rear axle and the outside wheel roll-center height h$_{rB}$ on the rear axle are expressed as follows.

$$h_{rA} = a_r S + h_{r0}$$
$$= a_r t\phi/2 + h_{r0}$$
$$h_{rB} = -a_r t\phi/2 + h_{r0}$$
$$= -a_r t\phi/2 h_{r0}$$

Figure 8:
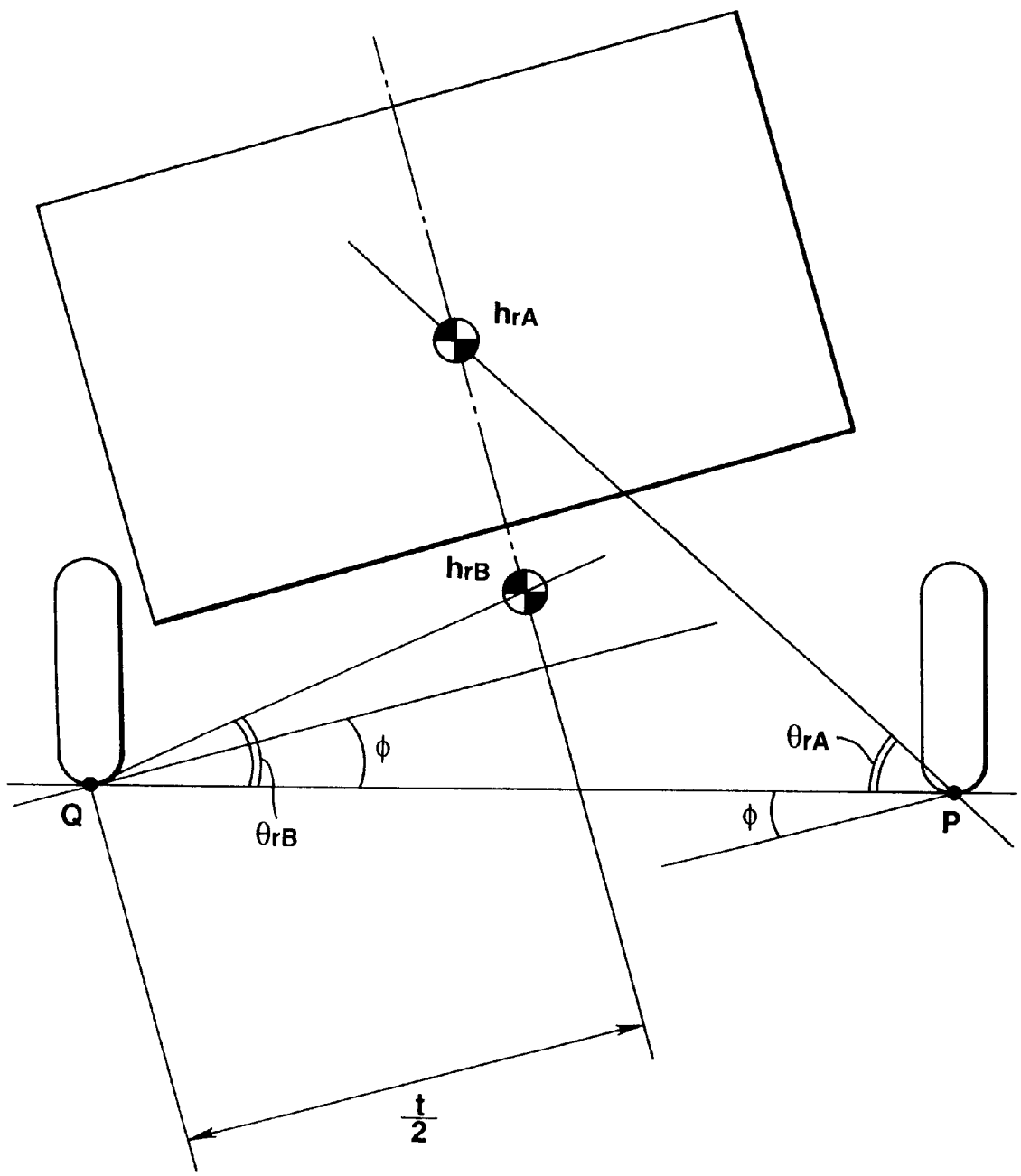
FIG. 8 is an illustration used for analysis of inside and outside wheel roll center heights $h_{rA}$ and $h_{rB}$ on the rear axle, an angle $\theta_{rA}$ between a horizontal line and the line segment including the center P of the inside tire contact and the inside wheel roll-center height $h_{rA}$, and an angle $\theta_{rB}$ between a horizontal line and the line segment including the center Q of the outside tire contact and the outside wheel roll-center height $h_{rB}$, during cornering.

As seen in FIG. 8, the angle $\theta_{rA}$ between a horizontal line and the line segment including the center P of the inside tire contact and the inside wheel roll-center height $h_{rA}$, and the angle $\theta_{rB}$ between a horizontal line and the line segment including the center Q of the outside tire contact and the outside wheel roll-center height $h_{rB}$, are expressed as follows, considering the roll angle $\phi$ of the body.

$$\theta_{rA} = h_{rA}/(t/2) - \phi$$
$$= a_r\phi + 2h_{r0}/t - \phi$$
$$\theta_{rB} = h_{rB}/(t/2) + \phi$$
$$= -a_r\phi + 2h_{r0}/t + \phi$$

As is generally known, in the rolled position the suspension roll stiffnesses including the spring stiffnesses on the two sides are different, so there is some heave of the vehicle body as a consequence of roll. As a consequence of the different stiffnesses on the two sides, the two different angles $\theta_{rB}$ and $\theta_{rA}$, and the two different cornering forces $F_{rA}$ and $F_{rB}$, so-called jacking forces are exerted on the outside and inside road wheels. The jacking force exerted on the rear inside wheel acts to move the rear inside wheel down, and thus the vertical downward force component will be hereinafter referred to simply as a "jack-down force". The jacking force exerted on the rear outside wheel acts to lift up the rear outside wheel, and thus the vertical upward force component will be hereinafter referred to simply as a "jack-up force". The jack-down force $J_{rA}$ created at the rear inside wheel and the jack-down force $J_{rB}$ created at the rear outside wheel are expressed as follows.

$$J_{rA} = F_{rA} \cdot \theta_{rA}$$
$$= \alpha W(1-\gamma) \cdot (1/2 - \alpha h/t) \cdot (a_r\phi + 2h_{r0}/t - \phi)$$
$$J_{rB} = F_{rB} \cdot \theta_{rB}$$
$$= \alpha W(1-\gamma) \cdot (1/2 + \alpha h/t) \cdot (-a_r\phi + 2h_{r0}/t + \phi)$$

Considering the spring constant $k_{rA}$ at each rear end of the vehicle on the extension during rebound and the spring constant $k_{rB}$ at each rear end of the vehicle on the compression during bound, the jacking-up amount $\delta_r$ at the center of the vehicle body in the traverse direction of the rear axle is expressed as follows.

$$\delta_r = (\frac{1}{2})(-J_{rA}/k_{rA} + J_{rB}/k_{rB})$$

During the steady cornering, a steady-state rebound amount $Z_{rA}$ of the rear inside wheel is expressed as follows, since the rebound amount $Z_{rA}$ is greatly affected by at least three factors, namely the jacking force $J_{rA}$, the lateral load transfer $\Delta W_r$ between the rear wheels, and the spring constant $k_{rA}$ at each rear end of the vehicle on the extension during rebound.

$$Z_{rA} = (\Delta W_r - J_{rA})/k_{rA}$$

Similarly, a steady-state bound amount $Z_{rB}$ of the rear outside wheel is expressed as follows, since the bound amount $Z_{rB}$ is greatly affected by at least three factors, namely the jacking force $J_{rB}$, the lateral load transfer $\Delta W_r$ between the rear wheels, and the spring constant $k_{rB}$ at each rear end of the vehicle on the compression during bound.

$$Z_{rB} = (\Delta W_r - J_{rB})/k_{rB}$$

In the same manner as set forth above, on the front suspension systems, when the car is in the steady-state cornering with a centripetal acceleration $\alpha$, the amount $\Delta W_f$ of load-transfer of the front suspension is expressed as follows.

$$\Delta W_f = W\gamma \alpha h/t$$

The wheel vertical force $W_{fA}$ (or the wheel vertical load) on one front inner road wheel, is obtained as the difference between one-half $(W/2)\cdot\gamma$ of the total front-wheel vertical force $W\gamma$ and the lateral load transfer $\Delta W_f$, as represented by the following expression.

$$W_{fA} = (W/2)\cdot\gamma - \Delta W_f$$
$$= (W/2)\cdot\gamma - W\gamma\alpha h/t$$
$$= W\gamma(1/2 - \alpha h/t)$$

The wheel vertical force $W_{fB}$ (or the wheel vertical load) on one front outer road wheel, is obtained as the sum of one-half $(W/2)\cdot\gamma$ of the total front-wheel vertical force $W\gamma$ and the lateral load transfer $\Delta W_f$, as represented by the following expression.

$$W_{fB} = (W/2)\cdot\gamma + \Delta W_f$$
$$= (W/2)\cdot\gamma + W\gamma\alpha h/t$$
$$= W\gamma(1/2 + \alpha h/t)$$

The total front wheel cornering force $F_f$ is expressed as $F_f = W\alpha\gamma$, and thus the front inner wheel cornering force $F_{fA}$ and the front outer wheel cornering force $F_{fB}$ are expressed as follows.

$$F_{fA} = W\alpha\gamma \cdot W_{fA}/(W_{fA} + W_{fB})$$
$$= W\alpha\gamma \cdot W\gamma(1/2 - \alpha h/t)/W\gamma$$
$$= W\alpha\gamma(1/2 - \alpha h/t)$$

$$F_{fB} = W\alpha\gamma \cdot W_{fB}/(W_{fA} + W_{fB})$$
$$= W\alpha\gamma \cdot W\gamma(1/2 + \alpha h/t)/W\gamma$$
$$= W\alpha\gamma(1/2 + \alpha h/t)$$

Assuming that the roll-center height characteristics of the front suspension systems are linear characteristics according to which the roll-center height hf of the front wheel varies linearly across the initial roll-center height $h_{f0}$ in accordance with changes in bound/rebound strokes, the inside wheel roll-center height $h_{fA}$ on the front axle and the outside wheel roll-center height $h_{fB}$ on the front axle are expressed as follows.

$$h_{fA} = a_f S + h_{f0}$$
$$= a_f t\phi/2 + h_{f0}$$

-continued $$h_{fB} = -a_f S + h_{f0}$$
$$= -a_f t\phi/2 + h_{f0}$$

By reference to the model of the rear suspensions shown in FIG. 8, on the front suspensions, the angle $\theta_{fA}$ between the horizontal line and the line segment including the center of the front inside tire contact and the front inside wheel roll-center height $h_{fA}$ and the angle $\theta_{fB}$ between the horizontal line and the line segment including the center of the front outside tire contact and the front outside wheel roll-center height $h_{fB}$, are expressed as follows, considering the total body roll angle $\phi$.

$$\theta_{fA} = h_{fA}/(t/2) - \phi$$
$$= a_f \phi + 2h_{f0}/t - \phi$$
$$\theta_{fB} = h_{fB}/(t/2) + \phi$$
$$= -a_f \phi + 2h_{f0}/t + \phi$$

The jack-down force $J_{fA}$ created at the front inside wheel and the jack-down force $J_{fB}$ created at the front outside wheel are expressed as follows.

$$J_{fA} = F_{fA} \cdot \theta_{fA}$$
$$= \alpha W \gamma \cdot (1/2 - \alpha h/t) \cdot (a_f \phi + 2h_{f0}/t - \phi)$$
$$J_{fB} = F_{fB} \cdot \theta_{fB}$$
$$= \alpha W \gamma \cdot (1/2 + \alpha h/t) \cdot (-a_f \phi + 2h_{f0}/t + \phi)$$

Considering the spring constant $k_{fA}$ at each front end of the vehicle on the extension during rebound and the spring constant $k_{fB}$ at each front end of the vehicle on the compression during bound, the jacking amount $\delta_f$ at the center of the vehicle body in the traverse direction of the front axle is expressed as follows.

$$\delta_f = (\frac{1}{2})(-J_{fA}/k_{fA} + J_{fB}/k_{fB})$$

During the steady-state cornering, a steady-state rebound amount $Z_{fA}$ of the front inside wheel is expressed as follows, since the rebound amount $Z_{fA}$ is greatly affected by at least three factors, namely the jacking force $J_{fA}$, the lateral load transfer $\Delta W_f$ between the front wheels, and the spring constant $k_{fA}$ at each front end of the vehicle on the extension during rebound.

$$Z_{fA} = (\Delta W_f - J_{fA})/k_{fA}$$

Similarly, in the steady-state cornering, a steady-state bound amount $Z_{fB}$ of the front outside wheel is expressed as follows, since the bound amount $Z_{fB}$ is greatly affected by at least three factors, namely the jacking force $J_{fB}$, the lateral load transfer $\Delta W_f$ between the front wheels, and the spring constant $k_{fB}$ at each front end of the vehicle on the compression during bound.

$$Z_{fB} = (\Delta W_f - J_{fB})/k_{fB}$$

In the case of the automobile independent suspension system made according to the invention, a necessary condition that the front end of the vehicle is in a falling mode (or a sinking mode) during cornering, is defined by the following inequality.

$$Z_{fA} \leq Z_{fB}$$

The expansion of the inequality $Z_{fA} \leq Z_{fB}$ is as follows.

$$(\Delta W_f - J_{fA})/k_{fA} \leq (\Delta W_f - J_{fB})/k_{fB} \quad (1)$$
$$k_{fB}/k_{fA} \leq (\Delta W_f - J_{fB})/(\Delta W_f - J_{fA})$$
$$= (\Delta W_f - F_{fB} \cdot \theta_{fB})/(\Delta W_f - F_{fA} \cdot \theta_{fA})$$
$$= \{h - (t/2 + \alpha h)(-a_f \phi + 2h_{f0}/t + \phi)\}/$$
$$\{h - (t/2 - \alpha h)(a_f \phi + 2h_{f0}/t - \phi)\}$$

Figure 9A:
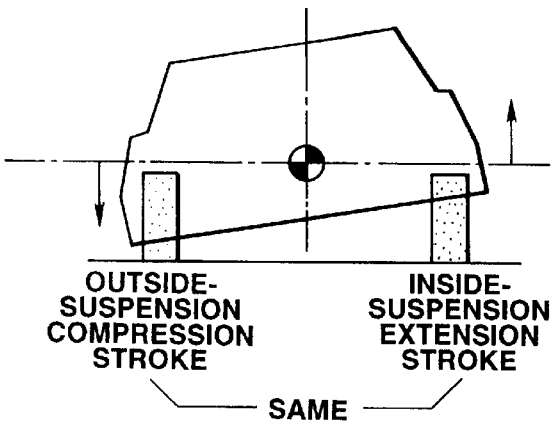
FIGS. 9A, 9B and 9C are explanatory views describing jack-up and jack-down characteristics, particularly FIGS. 9B and 9C respectively illustrating a vehicle-body falling state in which the front end of the vehicle body moves down and a vehicle-body rising state in which the rear end of the vehicle body moves up (jacks up), as compared with a usual state of FIG. 9A in which the outside-suspension compression stroke is essentially the same as the inside-suspension extension stroke.
Figure 9B:
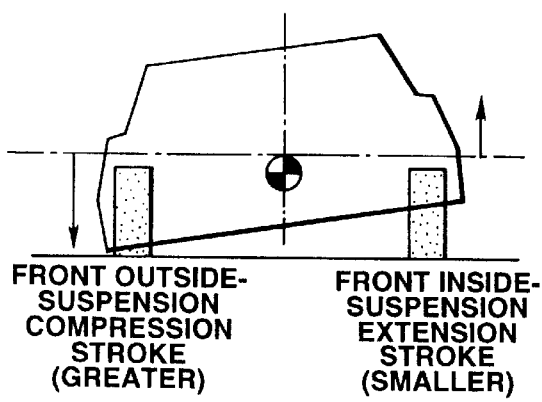

In this manner, we get the previously-noted inequality (1). According to the automobile independent suspension system of the embodiment in which the ratio $\epsilon_f$ ($=k_{fB}/k_{fA}$) of the spring constant $k_{fB}$ at each of front-left and front-right ends of the vehicle on compression during bound to the spring constant $k_{fA}$ at each of front-left and front-right ends of the vehicle on extension during rebound is determined to satisfy the inequality (1), the front end of the vehicle is put into the falling mode during cornering as shown in FIG. 9B.

In the case of the automobile independent suspension system made according to the invention, a necessary condition that the rear end of the vehicle is in a rising mode (or a floating mode) during cornering, is defined by the following inequality.

$$Z_{rA} \geq Z_{rB}$$

The expansion of the inequality $Z_{rA} \geq Z_{rB}$ is as follows.

$$(\Delta W_r - J_{rA})/k_{rA} \geq (\Delta W_r - J_{rB})/k_{rB} \quad (2)$$
$$k_{rB}/k_{rA} \geq (\Delta W_r - J_{rB})/(\Delta W_r - J_{rA})$$
$$= (\Delta W_r - F_{rB} \cdot \theta_{rB})/(\Delta W_r - F_{rA} \cdot \theta_{rA})$$
$$= \{h - (t/2 + \alpha h)(-a_r \phi + 2h_{r0}/t + \phi)\}/$$
$$\{h - (t/2 - \alpha h)(a_r \phi + 2h_{r0}/t - \phi)\}$$

Figure 9C:
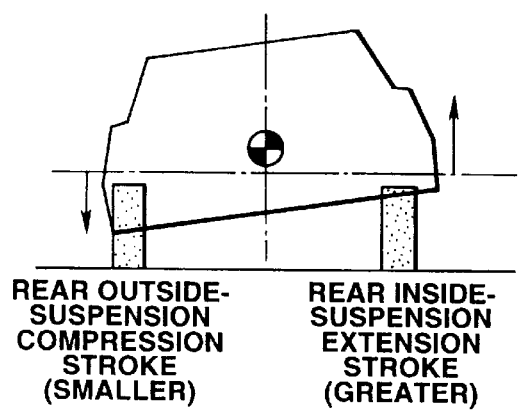

In this manner, we get the previously-noted inequality (2). According to the automobile independent suspension system of the embodiment in which the ratio $\epsilon_r$ ($=k_{rB}/k_{rA}$) of the spring constant $k_{rB}$ at each of rear-left and rear-right ends of the vehicle on compression during bound to the spring constant $k_{rA}$ at each of rear-left and rear-right ends of the vehicle on extension during rebound is determined to satisfy the inequality (2), the rear end of the vehicle is put into the rising mode during cornering as shown in FIG. 9C.

As set forth above, since the independent suspension system of the invention is designed to satisfy the first inequality (1) and/or the second inequality (2), the vehicle is kept in a specified vehicle attitude that the front end of the vehicle is fallen below the rear end of the vehicle, while permitting the inside wheels to move up in comparison with the outside wheels during cornering. This increases a feeling of security and thus enhances the driver's feel (particularly roll feel) during cornering. As compared with a vehicle attitude that there is no jack-up and no jack-down at the rear end of the vehicle as shown in FIG. 9A, it was experimentally verified by the inventor of the present application that a vehicle attitude (the rising mode) that the rear end of the vehicle is brought into the jack-up state as shown in FIG. 9C is superior to a vehicle attitude (the falling mode) that the rear end of the vehicle is brought into the jack-down state as shown in FIG. 9B, from the viewpoint of the roll feel. That is, during cornering the front end fallen (i.e., the falling roll center height on the front axle) ensures a good roll feel.

Figure 10:
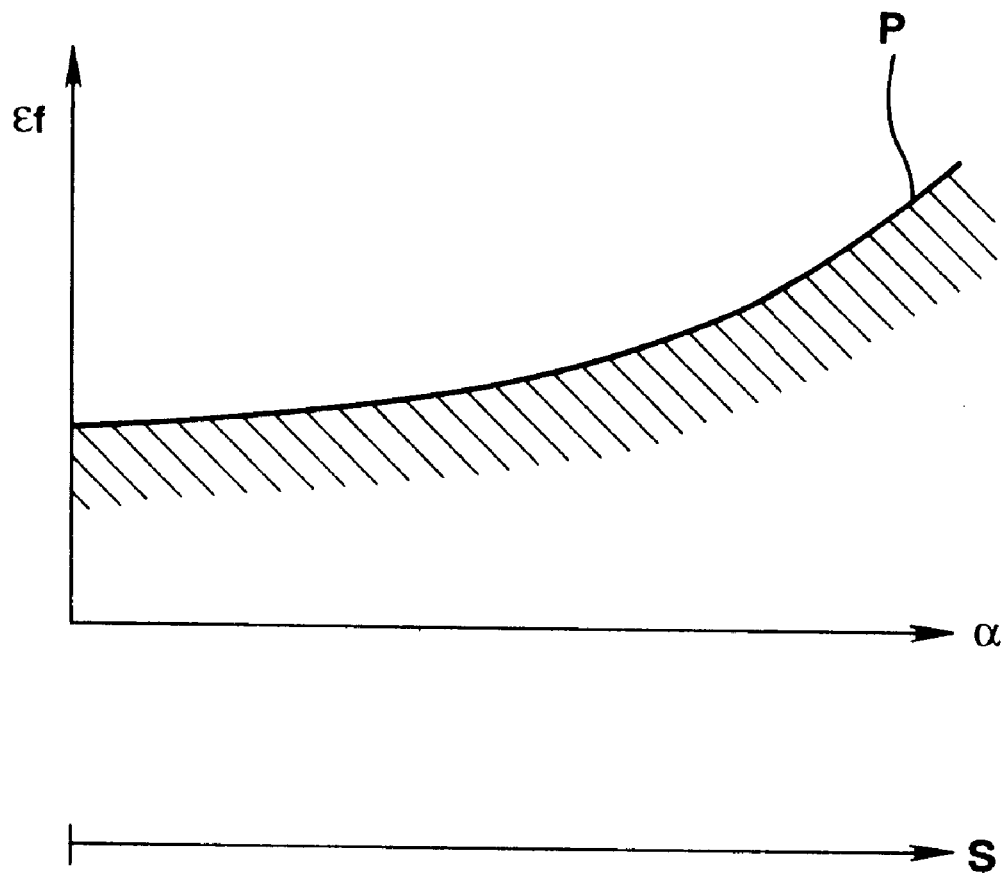
FIG. 10 is a characteristic curve showing the relationship between the centripetal acceleration $\alpha$ and the ratio $\epsilon_f$ of a spring constant $k_{fB}$ of the front outside suspension to a spring constant $k_{fA}$ of the front inside suspension.

Returning to FIG. 5, the wheel-load versus suspension stroke (bound/rebound strokes) characteristics are replaced with the relationship between the centripetal acceleration $\alpha$ and the ratio $\epsilon_f$ of the spring constant $k_{fB}$ to the spring constant $k_{fA}$, that is, the $\alpha$–$\epsilon_f$ characteristic curve P shown in FIG. 10. As previously-discussed, since the suspension stroke S is represented approximately by the equation $S=(t/2)\phi$, the relation between the stroke S and the ratio $\epsilon_f$, that is, the S–$\epsilon_f$ characteristic is represented like the characteristic curve P of FIG. 10. In other words, the ratio $\epsilon_f$ is represented as a function of the centripetal acceleration $\alpha$ just like the characteristic curve P shown in FIG. 10 when $\epsilon_f = \{h-(t/2+\alpha h)(-\alpha_f\phi+2h_{f0}/t+\phi)\}/\{h-(t/2-\alpha h)(a_f\phi+2h_{f0}/t-\phi)\}$. Therefore, the hatched region (the region below the characteristic curve P) of FIG. 10 corresponds to a characteristic region of the front suspension system satisfying the condition defined by the inequality (1). In the front suspension system of the embodiment, the spring-stiffness characteristic (the non-linear characteristic) of the bump rubber 25 and a discontinuity point (corresponding to the transition point from the region A to the region B in FIG. 5) of stiffness where the bump rubber 25 is engaged and begins to act, and the spring-stiffness characteristic (the linear characteristic) of the rebound spring 26 and a discontinuity point (corresponding to the transition point from the region A to the region C in FIG. 5) of stiffness where the rebound spring 26 is engaged and begins to act, are properly set to keep the relationship between the centripetal acceleration $\alpha$ and the ratio $\epsilon_f$ within the hatched region of FIG. 10. Briefly speaking, the condition that the relationship of $\alpha$ and $\epsilon_f$ is kept within the hatched region below the characteristic curve P of FIG. 10 means that the spring constant $k_{fA}$ is set to a relatively greater value in comparison with the ratio $\epsilon_f$ plotted on the characteristic curve P. The spring constants $k_{fA}$ and $k_{fB}$ at the front-wheel side (the front end) of the vehicle are determined essentially by the spring-stiffness characteristics of the rebound spring 26 and the bump rubber 25. In the front suspension systems, the condition defined by the inequality (1) is practically satisfied by setting the spring constant of the rebound spring 26 serving as the first auxiliary spring greater than the spring constant of the bump rubber 25 serving as the second auxiliary spring.

Figure 11A:
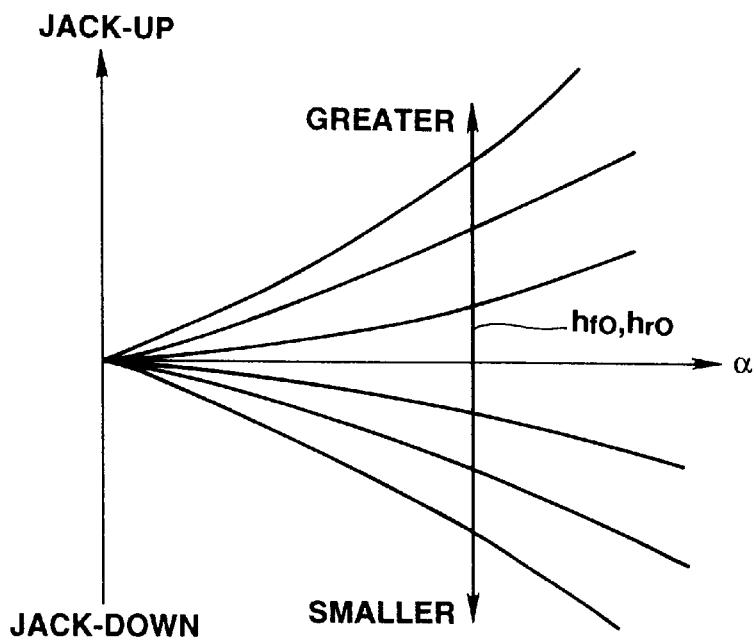
FIG. 11A is a graph illustrating the centripetal-acceleration ($\alpha$) versus jack-up/jack-down characteristics depending upon variations in the initial value ($h_{fo}$, $h_{ro}$) of roll center height.
Figure 11B:
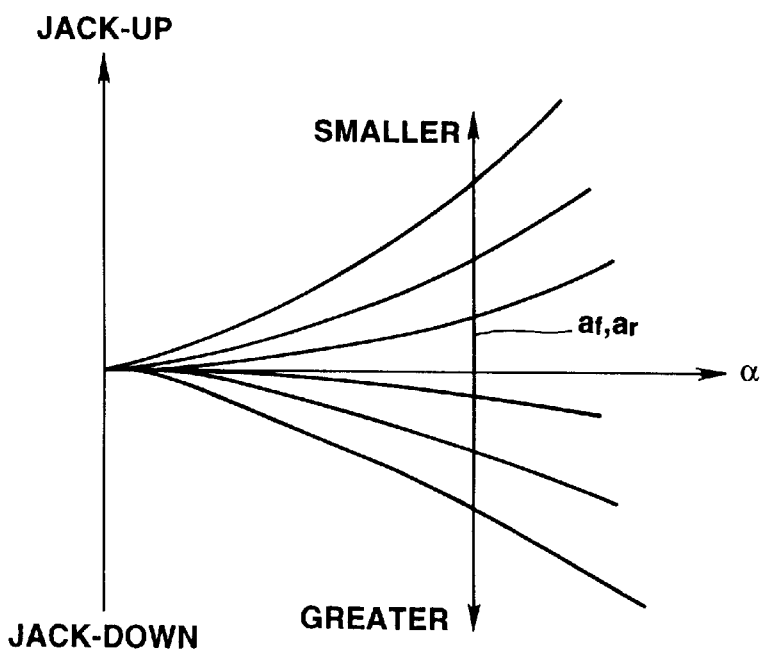
FIG. 11B is a graph illustrating the centripetal-acceleration ($\alpha$) versus jack-up/jack-down characteristics depending upon the rate of change ($a_f$, $a_r$) in roll center height at each of the front and rear suspensions.

On the contrary, as may be appreciated from comparison between the inequalities (1) and (2), the condition wherein the rear suspension system satisfies the condition defined by the inequality (2) means that the relationship between the centripetal acceleration $\alpha$ and the ratio $\epsilon_r$ (=$k_{rB}/k_{rA}$) of the spring constant $k_{rB}$ at each of rear-left and rear-right ends of the vehicle on compression during bound to the spring constant $k_{rA}$ at each of rear-left and rear-right ends of the vehicle on extension during rebound is kept within a region above the $\alpha$–$\epsilon_r$ characteristic curve of the same characteristics as the characteristic curve P shown in FIG. 10. In the rear suspension system of the embodiment, the spring-stiffness characteristic (the non-linear characteristic) of the bump rubber 25 and a discontinuity point (corresponding to the transition point from the region A to the region B in FIG. 5) of stiffness where the bump rubber 25 is engaged and begins to act, and the spring-stiffness characteristic (the linear characteristic) of the rebound spring 26 and a discontinuity point (corresponding to the transition point from the region A to the region C in FIG. 5) of stiffness where the rebound spring 26 is engaged and begins to act, are properly set to keep the relationship between the centripetal acceleration $\alpha$ and the ratio $\epsilon_r$ within the region above the $\alpha$–$\epsilon_r$ characteristic curve of the same characteristics as the characteristic curve P shown in FIG. 10. Briefly speaking, the condition that the relationship of $\alpha$ and $\epsilon_r$ is kept above the $\alpha$–$\epsilon_r$ characteristic curve, means that the spring constant $k_{rB}$ is set to a relatively greater value in comparison with the ratio $\epsilon_r$ plotted on the $\alpha$–$\epsilon_r$ characteristic curve. The spring constants $k_{rA}$ and $k_{rB}$ at the rear-wheel side (the rear end) of the vehicle are determined essentially by the spring-stiffness characteristics of the rebound spring 26 and the bump rubber 25. In the rear suspension systems, the condition defined by the inequality (1) is practically satisfied by setting the spring constant of the bump rubber 25 serving as the second auxiliary spring greater than the spring constant of the rebound spring 26 serving as the first auxiliary spring. As set forth above, according to the suspension system of the embodiment, the jack-up/jack-down characteristics and the roll-center height characteristics at front and rear suspensions are desiredly controlled by properly setting the ratio $\epsilon_f$ of the bound-stroke spring-constant $k_{fB}$ to the rebound-stroke spring-constant $k_{fA}$ at the front suspension system and/or the ratio $\epsilon_r$ of the bound-stroke spring-constant $k_{rB}$ to the rebound-stroke spring-constant $k_{rA}$ at the rear suspension system to satisfy the inequalities (1) and/or (2). As a measure of design of the front and rear suspensions satisfying the previously-noted inequalities (1) and/or (2), considered is the centripetal-acceleration $\alpha$ versus jack-up/jack-down characteristics based on variations in the initial value $h_{fo}$ of the roll center height at the front suspension and variations in the initial value $h_{ro}$ of the roll center height at the rear suspension system, as seen in FIG. 11A. Also considered is the centripetal-acceleration $\alpha$ versus jack-up/jack-down characteristics based on the rate of change ($a_f$, $a_r$) in roll center height at each of the front and rear suspensions as seen in FIG. 11B. These test results shown in FIGS. 11A and 11B are assured by the inventor of the present invention. As clearly seen in FIG. 11A, the increased initial value ($h_{f0}$, $h_{r0}$) of the roll center height at each of the front and rear suspensions increases jack-up characteristics (or jack-up tendencies), while the decreased initial value ($h_{f0}$, $h_{r0}$) of the roll center height increases jack-down characteristics (or jack-down tendencies). As clearly seen in FIG. 11B, the decreased rate-of-change ($a_f$, $a_r$) in roll center height at each of the front and rear suspensions increases the jack-up characteristics (or the jack-up tendencies), while the increased rate-of-change ($a_f$, $a_r$) increases the jack-down characteristics (the jack-down tendencies). Therefore, in order to insure a good roll feel, it is possible to increase jack-down tendencies at the front wheel side (at the front end of the vehicle) and to increase jack-up tendencies at the rear wheel side (at the rear end of the vehicle) during cornering by properly controlling or varying the jack-up and jack-down characteristics, while properly selecting the initial value ($h_{f0}$, $h_{r0}$) of the roll center height and the rate-of-change ($a_f$, $a_r$) in roll center height.

In the shown embodiment, although the fundamental concept of the present invention is applied to both the front and rear suspensions, that is, the condition defined by the inequality (2) and the condition defined by the inequality (1) are both satisfied, the concept of the present invention may be applied to either one of the front and rear suspensions. For instance, if the front end of the vehicle is put into the falling mode without any jacking-up at the rear end of the vehicle, the front end of the vehicle tends to be fallen relative to the rear end of the vehicle during cornering. As a consequence of the front end fallen relatively with respect to the rear end, a feeling of security can be enhanced and thus the roll feel can be improved. Likewise, if the rear end of the vehicle is put into the rising mode without any jacking-down at the front end of the vehicle, the rear end of the vehicle tends to be risen relative to the front end of the vehicle during cornering. As a consequence of the rear end risen relatively with respect to the front end, a feeling of security can be enhanced, thus providing a good roll feel. It will be appreciated that a good roll feel can be attained by setting the front end of the vehicle in the falling mode relatively with respect to the rear end of the vehicle. The condition that satisfies the relative falling mode of the front end relative to the rear end during cornering is expressed as the following inequality.

$$Z_{fB} - Z_{fA} \geq Z_{rB} - Z_{rA}$$

This inequality can be expanded as follows.

$$(\Delta W_f - J_{fB})/k_{fB} - (\Delta W_f - J_{fA})/k_{fA} \geq (\Delta W_r - J_{rB})/k_{rB} - (\Delta W_r - J_{rA})/k_{rA}$$

The above-mentioned expanded inequality is further expanded as follows.

$$(\gamma/k_{fB})\{h-(t/2+\alpha h)(-a_f\phi+2h_{f0}/t+\phi)\}-(\gamma/k_{fA})\{h-(t/2\alpha h)(a_f\phi+2h_{f0}/t-\phi)\}-\{(1-\gamma)/k_{rB}\}\{h-(t/2+\alpha h)(-a_r\phi+2h_{r0}/t+\phi)\}+\{(1-\gamma)/k_{rA}\}\{h-(t/2\alpha h)(a_r\phi+2h_{r0}/t-\phi)\} \geq 0 \quad (3)$$

In this manner, we can get a third inequality (3). In the inequality (3), for simplicity, the track $t_f$ being equivalent to the traverse distance between front-left and front-right road wheels is regarded as the track $t_r$ being equivalent to the traverse distance between rear-left and rear-right road wheels and represented generally as "t", although the track tf on the front axle is often different from the track tr on the rear axle. As can be appreciated, when the condition defined by the third inequality (3) is satisfied, the vehicle attitude is properly controlled so that the front end of the vehicle is put into the falling mode relative to the rear end during cornering irrespective of individual spring-stiffness characteristics of the front and rear suspensions. In the case that the condition defined by the third inequality is satisfied, even when the front and rear suspension systems both exhibit the jack-up tendencies during cornering, the jack-up characteristics of the front wheel side is weak as compared with the jack-up characteristics of the rear wheel side. This permits the falling mode of the front end of the vehicle relative to the rear end, and thus a good roll feel can be attained. When giving a definition of the jack-up/jack-down characteristics, the jack-up characteristics can be considered as a negative jack-down characteristics. The jack-up characteristic of the front wheel side weaker than that of the rear wheel side means that the jack-down characteristic of the front wheel side is stronger than that of the rear wheel side. Therefore, even if an automobile suspension system of increased jack-up tendencies is applied to a front suspension system, it is possible to easily maintain the falling mode of the front end relative to the rear end during cornering. Additionally, in the case that the condition defined by the third inequality is satisfied, even when the front and rear suspension systems both exhibit the jack-down tendencies during cornering, the jack-down characteristics of the front wheel side is kept to be stronger than the jack-down characteristics of the rear wheel side. This permits the falling mode of the front end of the vehicle relative to the rear end, and thus a good roll feel can be obtained.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automobile independent suspension system comprising:
   a front independent suspension having at least a spring placed between sprung and unsprung masses to support the sprung mass thereon, and a shock absorber placed between the sprung and unsprung masses to regulate spring rebound and bound; and
   a rear independent suspension having at least a spring placed between the sprung and unsprung masses to support the sprung mass thereon, and a shock absorber placed between the sprung and unsprung masses to regulate spring rebound and bound;
   wherein vertical downward jacking-force characteristics of said front suspension is set to be stronger relatively with respect to vertical downward jacking-force characteristics of said rear independent suspension, so that a front end of the vehicle is operated in a falling mode relatively with respect to a rear end of the vehicle during cornering.

2. An automotive front independent suspension system comprising:
   a spring placed between sprung and unsprung masses to support the sprung mass thereon; and
   a shock absorber placed between the sprung and unsprung masses to regulate spring rebound and bound,
   wherein said front independent suspension system has a spring constant $k_{fA}$ at each of front-left and front-right road wheels of an automotive vehicle on extension during rebound and a spring constant $k_{fB}$ at each of the front-left and front-right road wheels of the vehicle on compression during bound,
   wherein a ratio $\epsilon_f (=k_{fB}/k_{fA})$ of said spring constant $k_{fB}$ on compression during bound to said spring constant $k_{fA}$ on extension during rebound is determined to satisfy the following inequality, so that a vertical downward jacking-force component is created at a front end of the vehicle and the front end of the vehicle is operated in a falling mode relatively with respect to a rear end of the vehicle during cornering, $$\varepsilon_f \leq \frac{h-(t/2+\alpha \cdot h)(-a_f\phi+2h_{f0}/t+\phi)}{h-(t/2-\alpha \cdot h)(a_f\phi+2h_{f0}/t-\phi)}$$

where $\phi$ is a roll angle of the vehicle and is equal to $W\alpha h/(K_f+K_r)$, W is a car weight, $\alpha$ is a centripetal acceleration exerted on the vehicle, $K_f$ is a roll stiffness of a front wheel side, $K_r$ is a roll stiffness of a rear wheel side, h is a height of center of gravity of the vehicle, $h_{f0}$ is an initial height of roll center of the front wheel side, t is a track being equivalent to a traverse distance between left and right road wheels on a front axle, and $a_f$ is a rate of change in the roll center of the front wheel side with respect to a front-suspension stroke.

3. An automobile front independent suspension system comprising:
   a spring placed between sprung and unsprung masses to support the sprung mass thereon; and
   a shock absorber placed between the sprung and unsprung masses to regulate spring rebound and bound,
   wherein the shock absorber of said front independent suspension system has a first auxiliary spring placed at each of front-left and front-right ends of an automotive vehicle for suppressing rebound and a second auxiliary spring placed at each of the front-left and front-right ends of the vehicle for suppressing bound, wherein a spring constant of said first auxiliary spring is set to be greater than a spring constant of said second auxiliary spring, so that a vertical downward jacking-force component is created at a front end of the vehicle and the front end of the vehicle is operated in a falling mode relatively with respect to a rear end of the vehicle during cornering.

4. An automobile rear independent suspension system comprising:

a spring placed between sprung and unsprung masses to support the sprung mass thereon; and a shock absorber placed between the sprung and unsprung masses to regulate spring rebound and bound, wherein said rear independent suspension system has a spring constant $k_{rA}$ at each of rear-left and rear-right road wheels of an automotive vehicle on extension during rebound and a spring constant $k_{rB}$ at each of the rear-left and rear-right road wheels of the vehicle on compression during bound, wherein a ratio $\epsilon_r$ ($=k_{rB}/k_{rA}$) of said spring constant $k_{rB}$ on compression during bound to said spring constant $k_{rA}$ on extension during rebound is determined to satisfy the following inequality, so that a vertical upward jacking-force component is created at a rear end of the vehicle and the rear end of the vehicle is operated in a rising mode relatively with respect to a front end of the vehicle during cornering, $$\epsilon_r \geq \frac{h - (t/2 + \alpha \cdot h)(-a_r\phi + 2h_{r0}/t + \phi)}{h - (t/2 - \alpha \cdot h)(a_r\phi + 2h_{r0}/t - \phi)}$$

where $\phi$ is a roll angle of the vehicle and is equal to $W\alpha h/(K_f+K_r)$, W is a car weight, $\alpha$ is a centripetal acceleration exerted on the vehicle, $K_f$ is a roll stiffness of a front wheel side, $K_r$ is a roll stiffness of a rear wheel side, h is a height of center of gravity of the vehicle, $h_{r0}$ is an initial height of roll center of the front wheel side, t is a track being equivalent to a traverse distance between left and right road wheels on a rear axle, and $a_r$ is a rate of change in the roll center of the rear wheel side with respect to a rear-suspension stroke.

5. An automobile rear independent suspension system comprising:

a spring placed between sprung and unsprung masses to support the sprung mass thereon; and a shock absorber placed between the sprung and unsprung masses to regulate spring rebound and bound, wherein the shock absorber of said rear independent suspension system has a first auxiliary spring placed at each of rear-left and rear-right ends of an automotive vehicle for suppressing rebound and a second auxiliary spring placed at each of the rear-left and rear-right ends of the vehicle for suppressing bound, wherein a spring constant of said second auxiliary spring is set to be greater than a spring constant of said first auxiliary spring, so that a vertical upward jacking-force component is created at a rear end of the vehicle and the rear end of the vehicle is operated in a rising mode relatively with respect to a front end of the vehicle during cornering.

6. An automobile independent suspension system comprising:

a front independent suspension having at least a spring placed between sprung and unsprung masses to support the sprung mass thereon, and a shock absorber placed between the sprung and unsprung masses to regulate spring rebound and bound; and a rear independent suspension having at least a spring placed between the sprung and unsprung masses to support the sprung mass thereon, and a shock absorber placed between the sprung and unsprung masses to regulate spring rebound and bound, wherein said front independent suspension has a spring constant $k_{fA}$ at each of front-left and front-right road wheels of an automotive vehicle on extension during rebound and a spring constant $k_{fB}$ at each of the front-left and front-right road wheels of the vehicle on compression during bound, wherein said rear independent suspension has a spring constant $k_{rA}$ at each of rear-left and rear-right road wheels of the vehicle on extension during rebound and a spring constant $k_{rB}$ at each of the rear-left and rear-right road wheels of the vehicle on compression during bound, wherein said spring constant $k_{fA}$, $k_{fB}$, $k_{rA}$ and $k_{rB}$ are determined to satisfy the following inequality, so that a rear end of the vehicle is operated in a rising mode relatively with respect to a front end of the vehicle during cornering, $$\frac{\gamma}{k_{fB}}\{h - (t/2 + \alpha \cdot h)(-a_f\phi + 2h_{f0}/t + \phi)\} -$$
$$\frac{\gamma}{k_{fA}}\{h - (t/2 - \alpha \cdot h)(a_f\phi + 2h_{f0}/t - \phi)\} -$$
$$\frac{(1-\gamma)}{k_{rB}}\{h - (t/2 + \alpha \cdot h)(-a_r\phi + 2h_{r0}/t + \phi)\} +$$
$$\frac{(1-\gamma)}{k_{rA}}\{h - (t/2 - \alpha \cdot h)(a_r\phi + 2h_{r0}/t - \phi)\} \geq 0$$
; and where $\phi$ is a roll angle of the vehicle and is equal to $W\alpha h/(K_f+K_r)$, W is a car weight, $\alpha$ is a centripetal acceleration exerted on the vehicle, $K_f$ is a roll stiffness of a front wheel side, $K_r$ is a roll stiffness of a rear wheel side, h is a height of center of gravity of the vehicle, $\gamma$ is a car-weight distribution rate of the front road wheels with respect to the rear road wheels, $h_{f0}$ is an initial height of roll center of the front wheel side, $h_{r0}$ is an initial height of roll center of the rear wheel side, t is a track being equivalent to a traverse distance between left and right road wheels, $a_f$ is a rate of change in the roll center of the front wheel side with respect to a front-suspension stroke, and $a_r$ is a rate of change in the roll center of the rear wheel side with respect to a rear-suspension stroke.

7. A method of controlling lacking characteristics at an automobile front independent suspension system having at least a spring placed between sprung and unsprung masses to support the sprung mass thereon, and a shock absorber placed between the sprung and unsprung masses to regulate spring rebound and bound, the method comprising:

determining a lateral load transfer $\Delta W_f$ of a front independent suspension during a steady-state cornering, using the following expression, $$\Delta W_f = W\gamma\alpha h/t$$

where W is a car weight, $\gamma$ is a car-weight distribution rate of front road wheels with respect to rear road wheels, $\alpha$ is a centripetal acceleration exerted on an automotive vehicle, h is a height of center of gravity of the vehicle, and t is a track being equivalent to a traverse distance between left and right wheels on a front axle;

determining a cornering force $F_{fA}$ of a front inner wheel and a cornering force $F_{fB}$ of a front outer wheel, using the following expression, $F_{fA}$ W$\alpha\gamma$(½−$\alpha h/t$)

$F_{fB}$ W$\alpha\gamma$(½+$\alpha h/t$);

determining an angle $\theta_{fA}$ between a horizontal line and a line segment including a center of a front inside tire contact and a front inside wheel roll-center height, and an angle $\theta_{fB}$ between the horizontal line and a line segment including a center of a front outside tire contact and a front outside wheel roll-center height, using the following expression, $\theta_{fA}=a_f\phi+2h_{f0}/t-\phi$ $\theta_{fB}=-a_f\phi+2h_{f0}/t+\phi$ where $\phi$ is a roll angle of the vehicle and is equal to W$\alpha$h/($K_f$+$K_r$), $K_f$ is a roll stiffness of a front wheel side, $K_r$ is a roll stiffness of a rear wheel side, $h_{f0}$ is an initial height of roll center of the front wheel side, and $a_r$ is a rate of change in the roll center of the front wheel side with respect to a front-suspension stroke;

determining a vertical downward jacking force $J_{fA}$ created at the front inside wheel and a vertical upward jacking force $J_{fB}$ created at the front-outside wheel, using the following expression, $$J_{fA} = F_{fA} \cdot \theta_{fA}$$
$$= \alpha W\Upsilon \cdot (1/2 - \alpha h/t) \cdot (a_f\phi + 2h_{f0}/t - \phi)$$
$$J_{fB} = F_{fB} \cdot \theta_{fB}$$
$$= \alpha W\Upsilon \cdot (1/2 - \alpha h/t) \cdot (-a_f\phi + 2h_{f0}/t + \phi);$$

determining, during the steady-state cornering, a steady-state rebound amount $Z_{fA}$ of the front inside wheel and a steady-state bound amount $Z_{fB}$ of the front outside wheel, using the following expression, $Z_{fA}=(\Delta W_f - J_{fA})/k_{fA}$ $Z_{fB}=(\Delta W_f - J_{fB})/k_{fB}$ where $k_{fA}$ is a spring stiffness at each front end of the vehicle on extension during rebound and $k_{fB}$ is a spring stiffness at each front end of the vehicle on compression during bound;

determining a ratio $\epsilon_f(=k_{fB}/k_{fA})$ of said spring stiffness $k_{fB}$ on compression during bound to said spring stiffness $k_{fA}$ on extension during rebound, using the following expression which satisfies a condition defined by an inequality $Z_{fA} \leq Z_{fB}$ according to which a front end of the vehicle is operated in a falling mode being equivalent to stronger vertical downward jacking-force characteristics during cornering, $$\varepsilon_f \leq \frac{h - (t/2 + \alpha \cdot h)(-a_f\phi + 2h_{f0}/t + \phi)}{h - (t/2 - \alpha \cdot h)(a_f\phi + 2h_{f0}/t - \phi)}; \text{ and}$$

controlling jacking characteristics of said front independent suspension based on a suspension stiffness characteristics having said spring stiffness $k_{fB}$ on compression during bound and said spring stiffness $k_{fA}$ on extension during rebound, said ratio $\epsilon_f(=k_{fB}/k_{fA})$ of said spring stiffness $k_{fB}$ to said spring stiffness $k_{fA}$ being determined to satisfy said expression.

8. A method of controlling jacking characteristics at an automobile rear independent suspension system having at least a spring placed between sprung and unsprung masses to support the sprung mass thereon, and a shock absorber placed between the sprung and unsprung masses to regulate spring rebound and bound, the method comprising:

determining a lateral load transfer $\Delta W_r$ of a rear independent suspension during a steady-state cornering, using the following expression, $\Delta W_r = W(1-\gamma)\alpha h/t$ where W is a car weight, $\gamma$ is a car-weight distribution rate of front road wheels with respect to rear road wheels, $\alpha$ is a centripetal acceleration exerted on an automotive vehicle, h is a height of center of gravity of the vehicle, and t is a track being equivalent to a traverse distance between left and right wheels on a rear axle;

determining a cornering force $F_{fA}$ of a front inner wheel and a cornering force $F_{fB}$ of a front outer wheel, using the following expression, $F_{fA}=\alpha W(1-\gamma)\cdot\{½-\alpha h/t\}$ $F_{fB}=\alpha W(1-\gamma)\cdot\{½+\alpha h/t\};$ determining an angle $\theta_{rA}$ between a horizontal line and a line segment including a center of a rear inside tire contact and a rear inside wheel roll-center height, and an angle $\theta_{rB}$ between the horizontal line and a line segment including a center of a rear outside tire contact and a rear outside wheel roll-center height, using the following expression, $\theta_{rA}=a_r\phi+2h_{r0}/t-\phi$ $\theta_{rB}=a_r\phi+2h_{r0}/t+\phi$ where $\phi$ is a roll angle of the vehicle and is equal to w$\alpha$h/($K_f$+$K_r$), $K_f$ is a roll stiffness of a front wheel side, $K_r$ is a roll stiffness of a rear wheel side, $h_{r0}$ is an initial height of roll center of the rear wheel side, and $a_r$ is a rate of change in the roll center of the rear wheel side with respect to a rear-suspension stroke;

determining a vertical downward jacking force $J_{rA}$ created at the rear inside wheel and a vertical upward jacking force $J_{rB}$ created at the rear-outside wheel, using the following expression, $$J_{rA} = F_{rA} \cdot \theta_{rA}$$
$$= \alpha W(1-\Upsilon) \cdot (1/2 - \alpha h/t) \cdot (a_r\phi + 2h_{r0}/t - \phi)$$
$$J_{rB} = F_{rB} \cdot \theta_{rB}$$
$$= \alpha W(1-\Upsilon) \cdot (1/2 - \alpha h/t) \cdot (-a_r\phi + 2h_{r0}/t + \phi);$$

determining, during the steady-state cornering, a steady-state rebound amount $Z_{rA}$ of the rear inside wheel and a steady-state bound amount $Z_{rB}$ of the rear outside wheel, using the following expression, $Z_{rA}=(\Delta W_r - J_{rA})/k_{rA}$ $Z_{rB}=(\Delta W_r - J_{rB})/k_{rB}$ where $k_{rA}$ is a spring stiffness at each rear end of the vehicle on extension during rebound and $k_{rB}$ is a spring stiffness at each rear end of the vehicle on compression during bound;

determining a ratio $\epsilon_r$ ($=k_{rB}/k_{rA}$) of said spring stiffness $k_{rB}$ on compression during bound to said spring stiffness $k_{rA}$ on extension during rebound, using the following expression which satisfies a condition defined by an inequality $Z_{rA} \leq Z_{rB}$ according to which a rear end of the vehicle is operated in a rising mode being equivalent to stronger jack-up characteristics during cornering, $$\epsilon_r \geq \frac{h - (t/2 + \alpha \cdot h)(-a_r\phi + 2h_{rO}/t + \phi)}{h - (t/2 - \alpha \cdot h)(a_r\phi + 2h_{rO}/t - \phi)} ; \text{ and}$$

controlling jack-up characteristics of said rear independent suspension based on a suspension stiffness characteristics having said spring stiffness $k_{rB}$ on compression during bound and said spring stiffness $k_{rA}$ on extension during rebound, said ratio $\epsilon_r$ ($=k_{rB}/k_{rA}$) of said spring stiffness $k_{rB}$ to said spring stiffness $k_{rA}$ being determined to satisfy said expression.

9. A method of controlling jacking characteristics at an automobile independent suspension system employing a front independent suspension having at least a spring placed between sprung and unsprung masses to support the sprung mass thereon and a shock absorber placed between the sprung and unsprung masses to regulate spring rebound and bound and a rear independent suspension system having at least a spring placed between the sprung and unsprung masses to support the sprung mass thereon and a shock absorber placed between the sprung and unsprung mosses to regulate spring rebound and bound, the method comprising:

determining lateral load transfers $\Delta W_f$ and $\Delta W_r$ of the front and rear independent suspensions during a steady-state cornering, using the following expression, $\Delta W_f = W\gamma \alpha h/t$ $\Delta W_r = W(1-\gamma)\alpha h/t$ where W is a car weight, $\gamma$ is a car-weight distribution rate of front road wheels with respect to rear road wheels, $\alpha$ is a centripetal acceleration exerted on an automotive vehicle, h is a height of center of gravity of the vehicle, and t is a track being equivalent to a traverse distance between left and right wheels;

determining a cornering force $F_{fA}$ of a front inner wheel, a cornering force $F_{fB}$ of a front outer wheel, a cornering force $F_{rA}$ of a rear inner wheel, and a cornering force $F_{rB}$ of a rear outer wheel, using the following expression, $F_{fA} = W\alpha\gamma(\frac{1}{2} - \alpha h/t)$ $F_{fB} = W\alpha\gamma(\frac{1}{2} - \alpha h/t)$ $F_{rA} = \alpha W(1-\gamma) \cdot \{\frac{1}{2} - \alpha h/t\}$ $F_{rB} = \alpha W(1-\gamma) \cdot \{\frac{1}{2} + \alpha h/t\}$ determining an angle $\theta_{fA}$ between a horizontal line and a line segment including a center of a front inside tire contact and a front inside wheel roll-center height, an angle $\theta_{fB}$ between the horizontal line and a line segment including a center of a front outside tire contact and a front outside wheel roll-center height, an angle $\theta_{rA}$ between the horizontal line and a line segment including a center of a rear inside tire contact and a rear inside wheel roll-center height and an angle $\theta_{rB}$ between the horizontal line and a line segment including a center of a rear outside tire contact and a rear outside wheel roll-center height, using the following expression, $\theta_{fA} = a_f\phi + 2h_{f0}/t - \phi$ $\theta_{fB} = -a_f\phi + 2h_{f0}/t + \phi$ $\theta_{rA} = a_r\phi + 2h_{r0}/t - \phi$ $\theta_{rB} = -a_r\phi + 2h_{r0}/t + \phi$ where $\phi$ is a roll angle of the vehicle and is equal to $W\alpha h/(K_f+K_r)$, $K_f$ is a roll stiffness of a front wheel side, $K_r$ is a roll stiffness of a rear wheel side, $h_{f0}$ is an initial height of roll center of the front wheel side, and $a_f$ is a rate of change in the roll center of the front wheel side with respect to a front-suspension stroke, $h_{r\phi}$ is an initial height of roll center of the rear wheel side, $a_r$ is a rate of change in the roll center of the rear wheel side with respect to a rear-suspension stroke;

determining a vertical downward jacking force $J_{fA}$ created at the front inside wheel, a vertical upward jacking force $J_{fB}$ created at the front-outside wheel, a vertical downward jacking force $J_{rA}$ created at the rear inside wheel, and a vertical upward jacking force $J_{rB}$ created at the rear-outside wheel, using the following expression, $$J_{fA} = F_{fA} \cdot \theta_{fA}$$
$$= \alpha W\Upsilon \cdot (1/2 - \alpha h/t) \cdot (a_f\phi + 2h_{f0}/t - \phi)$$
$$J_{fB} = F_{fB} \cdot \theta_{fB}$$
$$= \alpha W\Upsilon \cdot (1/2 + \alpha h/t) \cdot (a_f\phi + 2h_{f0}/t + \phi)$$

$$J_{rA} = F_{rA} \cdot \theta_{rA}$$
$$= \alpha W(1 - \Upsilon) \cdot (1/2 - \alpha h/t) \cdot (a_r\phi + 2h_{r0}/t - \phi)$$
$$J_{rB} = F_{rB} \cdot \theta_{rB}$$
$$= \alpha W(1 - \Upsilon) \cdot (1/2 - \alpha h/t) \cdot (-a_r\phi + 2h_{r0}/t + \phi);$$

determining, during the steady-state cornering, a steady-state rebound amount $Z_{fA}$ of the front inside wheel, a steady-state bound amount $Z_{fB}$ of the front outside wheel, a steady-state rebound amount $Z_{rA}$ of the rear inside wheel, and a steady-state bound amount $Z_{rB}$ of the rear outside wheel, using the following expression, $Z_{fA} = (\Delta W_f - J_{fA})/k_{fA}$ $Z_{fB} = (\Delta W_f - J_{fB})/k_{fB}$ $Z_{rA} = (\Delta W_r - J_{rA})/k_{rA}$ $Z_{rB} = (\Delta W_r - J_{rB})/k_{rB}$ where $k_{fA}$ is a spring stiffness at each front end of the vehicle on extension during rebound, $k_{fB}$ is a spring stiffness at each front end of the vehicle on compression during bound, $k_{rA}$ is a spring stiffness at each rear end of the vehicle on extension during rebound, and $k_{rB}$ is a spring stiffness at each rear end of the vehicle on compression during bound;

determining said spring stiffnesses $k_{fA}$, $k_{fB}$, $k_{rA}$ and $k_{rB}$, using the following expression which satisfies a condition defined by an inequality $Z_{fB} - Z_{fA} \leq -Z_{rB} - Z_{rA}$ according to which a front end of the vehicle is operated in a falling mode being equivalent to stronger vertical downward jacking-force characteristics, relatively with respect to the rear end of the vehicle during cornering, $$\frac{\gamma}{k_{fB}}\{h-(t/2+\alpha\cdot h)(-a_f\phi+2h_{f0}/t+\phi)\}-$$
$$\frac{\gamma}{k_{fA}}\{h-(t/2-\alpha\cdot h)(a_f\phi+2h_{f0}/t-\phi)\}-$$
$$\frac{(1-\gamma)}{k_{rB}}\{h-(t/2+\alpha\cdot h)(-a_r\phi+2h_{r0}/t+\phi)\}+$$
$$\frac{(1-\gamma)}{k_{rA}}\{h-(t/2-\alpha\cdot h)(a_r\phi+2h_{r0}/t-\phi)\}\geq 0$$
; and controlling jacking characteristics of said front independent suspension based on a suspension stiffness characteristics having said spring stiffness $k_{fB}$ on compression during bound and said spring stiffness $k_{fA}$ on extension during rebound, and on a suspension stiffness characteristics having said spring stiffness $k_{rB}$ on compression during bound and said spring stiffness $k_{rA}$ on extension during rebound, said spring stiffnesses $k_{fA}$, $k_{fB}$, $k_{rA}$ and $k_{rB}$ being determined to satisfy said expression.

* * * * *